(12) United States Patent
Mokvist

(10) Patent No.: US 12,104,120 B2
(45) Date of Patent: Oct. 1, 2024

(54) METHOD AND SYSTEM FOR CONVERSION OF BIOMASS TO BIOFUEL AND EXTRACTION OF CARBON-CONTAINING PRODUCTS

(71) Applicant: Anders Mokvist, Snellville, GA (US)

(72) Inventor: Anders Mokvist, Snellville, GA (US)

( * ) Notice: Subject to any disclaimer, the term of this patent is extended or adjusted under 35 U.S.C. 154(b) by 0 days.

(21) Appl. No.: 18/503,850

(22) Filed: Nov. 7, 2023

(65) Prior Publication Data

US 2024/0067881 A1    Feb. 29, 2024

Related U.S. Application Data

(63) Continuation of application No. 17/317,875, filed on May 11, 2021, now Pat. No. 11,807,814.

(Continued)

(51) Int. Cl.
     *C10G 1/00*      (2006.01)
     *B01D 3/14*      (2006.01)
     *C10L 1/08*      (2006.01)

(52) U.S. Cl.
     CPC .............. *C10G 1/002* (2013.01); *B01D 3/14* (2013.01); *C10L 1/08* (2013.01);
(Continued)

(58) Field of Classification Search
     CPC ........ C10G 2300/1011; C10G 2400/04; C10L 2290/24
See application file for complete search history.

(56) References Cited

U.S. PATENT DOCUMENTS

| | | |
|---|---|---|
| 8,365,433 B2 | 2/2013 | Ogura |
| 8,877,995 B2 | 11/2014 | Baird et al. |

(Continued)

FOREIGN PATENT DOCUMENTS

| | | |
|---|---|---|
| CA | 3176316 | 10/2022 |
| CN | 205328967 U | 6/2016 |

(Continued)

OTHER PUBLICATIONS

International Search Report and Written Opinion mailed Aug. 11, 2021 cited in Application No. PCT/US21/31879, 9 pgs.

(Continued)

*Primary Examiner* — Ellen M McAvoy
*Assistant Examiner* — Ming Cheung Po
(74) *Attorney, Agent, or Firm* — BEKIARES ELIEZER LLP

(57) ABSTRACT

Disclosed herein is a method and system for converting biomass to biofuel, comprising a reaction apparatus including: a reaction tank configured to hold a process fluid; at least one mechanical rotating device comprising: a submergible chamber configured to operate within process, the submergible chamber having a first section including a first rotatable member and configured to receive biomass feedstock; a second section including a second rotatable member and configured to process biomass feedstock; and a third section including a third rotatable member and configured to treat the processed biomass feedstock effective to convert the processed biomass feedstock; a shaft in operable communication with each of the first, second, and third rotatable members for rotating said rotatable members about an axis; and a drive source for driving the shaft about said axis. Also disclosed herein are kits and methods for using the disclosed system to produce biofuel.

20 Claims, 24 Drawing Sheets

Related U.S. Application Data

(60) Provisional application No. 63/022,961, filed on May 11, 2020.

(52) U.S. Cl.
CPC .. *C10G 2300/1011* (2013.01); *C10G 2400/04* (2013.01); *C10L 2200/0469* (2013.01); *C10L 2270/026* (2013.01); *C10L 2290/24* (2013.01); *C10L 2290/543* (2013.01)

(56) References Cited

U.S. PATENT DOCUMENTS

| | | | |
|---|---|---|---|
| 9,545,609 B2 | 1/2017 | Van Thorre et al. | |
| 9,816,035 B2 | 11/2017 | Lehoux et al. | |
| 11,807,814 B2 | 11/2023 | Mokvist | |
| 2009/0286295 A1* | 11/2009 | Medoff | C12P 7/56 435/243 |
| 2010/0055741 A1 | 3/2010 | Galves, III et al. | |
| 2010/0099151 A1* | 4/2010 | Stroiazzo-Mougin | A01G 33/00 435/155 |
| 2012/0157730 A1 | 6/2012 | Powell et al. | |
| 2015/0183961 A1* | 7/2015 | Talwar | C08L 95/00 44/307 |
| 2016/0160124 A1 | 6/2016 | Strimling | |
| 2018/0163140 A1 | 6/2018 | Chiaberge et al. | |
| 2021/0348058 A1 | 11/2021 | Mokvist | |

FOREIGN PATENT DOCUMENTS

| | | |
|---|---|---|
| CN | 205439346 U | 8/2016 |
| CN | 205731160 U | 11/2016 |
| CN | 205774380 U | 12/2016 |
| CN | 206381959 U | 8/2017 |
| CN | 206853635 U | 1/2018 |
| CN | 206881848 U | 1/2018 |
| CN | 207072931 U | 3/2018 |
| CN | 207243908 U | 4/2018 |
| CN | 105623772 B | 5/2018 |
| CN | 108117901 A | 6/2018 |
| CN | 207570252 U | 7/2018 |
| CN | 108359509 A | 8/2018 |
| CN | 108525820 A | 9/2018 |
| CN | 109058975 A | 12/2018 |
| CN | 106582996 B | 1/2019 |
| CN | 109126588 A | 1/2019 |
| CN | 106492967 B | 2/2019 |
| CN | 208574722 U | 3/2019 |
| CN | 109603709 A | 4/2019 |
| CN | 109621840 A | 4/2019 |
| CN | 209068905 U | 7/2019 |
| CN | 110152820 A | 8/2019 |
| EP | 21804281.0 | 11/2022 |
| GB | 173907 | 1/1922 |
| JP | 2011178859 A | 9/2011 |
| JP | 2013112802 A | 6/2013 |
| KR | 2020080001143 | 5/2008 |
| KR | 101541824 | 4/2015 |
| WO | 2018025423 A1 | 2/2018 |
| WO | 2018199409 A | 11/2018 |
| WO | 2021231506 A1 | 11/2021 |

OTHER PUBLICATIONS

International Preliminary Report on Patentability mailed Nov. 24, 2022 cited in Application No. PCT/US21/31879, 8 pgs.

U.S. Office Action mailed Feb. 2, 2023 cited in U.S. Appl. No. 17/317,875, 14 pgs.

* cited by examiner

*10306 (25)*

METHOD AND SYSTEM FOR CONVERSION OF BIOMASS TO BIOFUEL AND EXTRACTION OF CARBON-CONTAINING PRODUCTS

RELATED APPLICATIONS

This application is a continuation of U.S. application Ser. No. 17/317,875 filed on May 11, 2021, which issues on Nov. 7, 2023 as U.S. Pat. No. 11,807,814, which claims the benefit of and priority to U.S. Provisional Application No. 63/022,961 filed on May 11, 2020, the entirety of which are hereby incorporated herein by reference.

FIELD OF INVENTION

The present invention relates to methods and system for conversion of biomass to biofuel, such as liquid biodiesel.

BACKGROUND OF THE INVENTION

In the production of renewable biofuels, such as diesel, from cellulosic material, most prior commercial systems and processes have been based on pyrolysis with different levels of success. Further, prior commercial systems are also very expensive, time consuming, and require many process steps. In such a pyrolysis process, where the temperature in a reactor needs to reach above 350 degrees Celsius, undesirable byproducts such as dioxins, furans, and coke are produced among the reaction product. After the pyrolysis step, the reaction product then needs to be further converted through gasification or other additional processing to produce a desirable, useable final product. As such, a majority of the products produced in these prior commercial processes are not able to be converted and end up being burned for process heat. To this end, only 20% or less of the biomass calorific value is converted to biofuel.

While progress has been made in efforts to convert cellulosic feed stock to ethanol through a dilute acid process, they have been unsuccessful in meeting viable commercial targets. When converting cellulose to sugar, the process requirements of high temperature and pressure, in combination with low pH, makes the required process equipment material selection limited and expensive. Furthermore, the product from this process is a tarlike sugar and lignin mixture, which makes the sugar extraction a challenge. Still further, ethanol as a fuel source has drawbacks including: a lower heat value production (29 MJ/Kg for ethanol compared to 43 MJ/Kg for gasoline and diesel), and, since ethanol is an alcohol, it is subject to water absorption.

Accordingly, there remains a need for a process and system for converting biomass to biofuel that can use cellulosic biomass as feed to produce an alternate biofuel to ethanol. Such a process and system for the conversion of biomass to liquid biofuel would preferably be capable of increasing yield, reducing energy requirements, reducing costs, and reducing the footprint of the system. This need and other needs are satisfied by the various aspects of the present disclosure.

SUMMARY OF THE INVENTION

In accordance with the purposes of the invention, as embodied and broadly described herein, the invention, in one aspect, relates to a method and system for conversion of biomass to biofuel. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

In one illustrative aspect, the invention relates to a method and system for converting biomass to biofuel, such as biodiesel. To achieve an improved conversion of biomass to liquid biofuel, the disclosed method and system can advantageously produce biomass exhibiting more uniform and smaller particle size. In further aspects, the disclosed method and system can expose processed biomass to mixing and kneading with the process fluid effective to promote the required interaction of the biomass and the process fluid.

In another illustrative aspect, the invention relates to an integrated reaction apparatus comprising: a) a process or reaction tank having an inner surface defining an interior space and configured to hold a reaction or process fluid; and b) at least one mechanical rotating device comprising: a submergible chamber configured to operate within process fluid contained within the reaction tank, the submergible chamber having an inner surface defining an interior space and comprising a plurality of zones including: at least one zone or section configured to receive and feed biomass feedstock to an adjacent zone; at least one zone or section configured to process or size reduce biomass feedstock received from an adjacent zone; and at least one zone or section configured to treat or need the size reduced biomass feedstock with process fluid and catalyst under conditions effective to convert at least a portion of the processed biomass feedstock to at least one reaction product.

In another illustrative aspect, the invention relates to a system for converting biomass to biofuel, the system comprising a reaction apparatus comprising: a reaction tank having an inner surface defining an interior space and configured to hold a process fluid; at least one mechanical rotating device comprising: a submergible chamber configured to operate within reaction fluid contained within the reaction tank, the submergible chamber having an inner surface defining an interior space and comprising a plurality of zones including: a zone (or section) including a rotatable member and configured to process biomass feedstock; and a zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis; and a drive source for driving the shaft about said axis. In some aspects, the chamber may comprise an additional zone with an additional rotatable member for receiving feedstock.

In another illustrative aspect, the invention relates to a system for converting biomass to biofuel, the system comprising: a reaction apparatus comprising: a) a reaction tank having an inner surface defining an interior space and configured to hold a reaction or process fluid; b) at least one mechanical rotating device comprising: a submergible chamber configured to operate within reaction fluid contained within the reaction tank, the submergible chamber having an inner surface defining an interior space and comprising a plurality of zones including: a first zone (or section) including a first rotatable member and configured to receive biomass feedstock; a second zone (or section) including a second rotatable member and configured to process biomass feedstock from the first feeding zone; and a third reaction zone (or section) including a third rotatable member and configured to treat the processed biomass feedstock effective to convert at least a portion of the processed biomass feedstock to at least one reaction product; a shaft in operable communication with each of the first, second, and third rotatable members for rotating said rotatable members about an axis; and a drive source for driving the shaft about said axis. In further aspects, the system may further comprise a biomass feed module, a distillation module, and/or a biofuel polishing module.

In another illustrative aspect, the invention relates to a mechanical rotating device configured to operatively couple with a reaction tank, the mechanical rotating device comprising a submergible chamber configured to operate within process fluid contained within the reaction tank, the submergible chamber having an inner surface defining an interior space and comprising a plurality of zones including a zone (or section) including a rotatable member and configured to process biomass feedstock; and a reaction zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis. In some aspects, the shaft may be configured to be driven about said axis using a drive source. In other aspects, multiple mechanical rotating devices may be operated in a single reaction tank or vessel. In further aspects, the disclosed device can be used for various applications in addition to conversion of biomass to biofuel, such as, and without limitation, extraction of lignin, oils, and other components from different biomass types. In some aspects, the reaction or process fluid may be carrier oil. In other aspects, the reaction or process fluid may be a solvent. Without wishing to be bound by a particular theory, embodiment of the disclosed device and systems include a reaction zone with an inventive conical design and configuration that can allow for closer and sustained contact between the process fluid and the biomass.

In further aspects, the invention also relates to additional methods for using the disclosed apparatuses and systems to convert biomass to biofuels and extract carbon containing products.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are illustrative and explanatory only and are not restrictive of the invention, as claimed. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate several aspects of the invention and together with the description, serve to explain the principles of the invention. The drawings may contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1A:
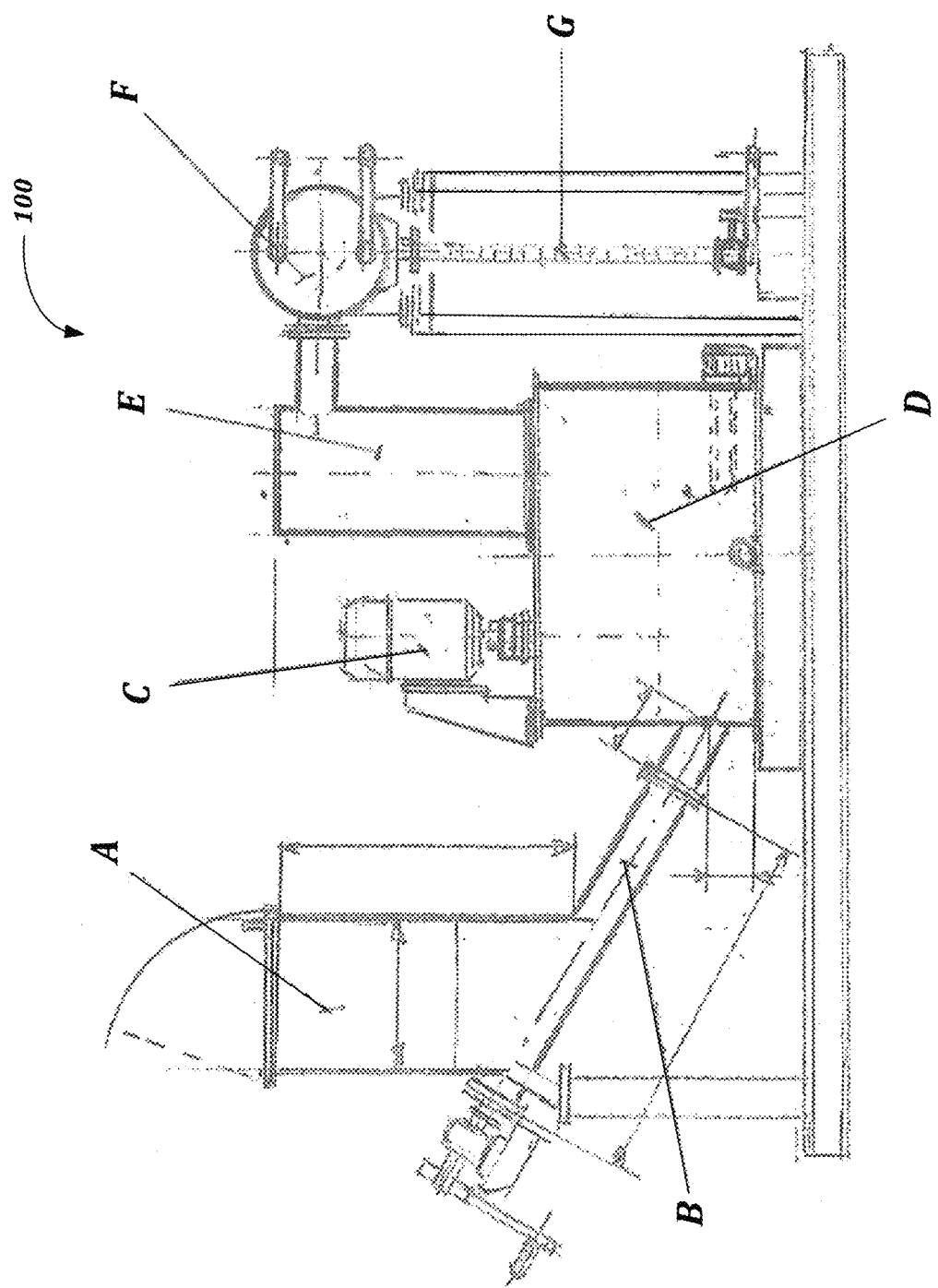
FIGS. 1A-1B show depiction of a system in an operating environment in accordance with an illustrative embodiment of the present disclosure.

The present invention can be understood more readily by reference to the following detailed description of the invention and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this invention belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "a tank" includes two or more tanks.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Disclosed are the materials, components, parts, and/or elements to be used to manufacture the disclosed devices and systems of the invention as well as the materials themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the invention. Thus, if there are a variety of additional steps that can be performed it is understood that each of these additional steps can be performed with any specific aspect or combination of aspects of the methods of the invention.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

B. System and Device Overview

As briefly described above, the present disclosure provides, in various aspects, a method, device and system for converting biomass to biofuel, such as biodiesel. In one aspect, to achieve an improved conversion of biomass to liquid biofuel, the disclosed method and system can advantageously produce biomass exhibiting more uniform and smaller particle size. In further aspects, the disclosed method and system employing a reaction zone having an inventive conical design and configuration can expose processed biomass to mixing and kneading with the process fluid effective to promote the required interaction of the biomass and the process fluid.

This overview is provided to introduce a selection of concepts in a simplified form that are further described below. This overview is not intended to identify key features or essential features of the claimed subject matter. Nor is this overview intended to be used to limit the claimed subject matter's scope. For example, the disclosed method and system may have several other use cases or applications, such as, the use of a solvent to separate lignin and cellulose, and other components of biomass.

In various aspects, the present invention provides a system that can include an integrated reactor apparatus that can eliminate the need for separate process vessels, such as separate mixing vessel and/or secondary distillation vessel. In further aspects, the integrated reactor apparatus, which can utilize a submergible mechanical rotating device, can be configured to produced processed biomass exhibiting more uniform and smaller particle sizes. In still further aspects, the integrated reactor apparatus can be configured to expose the processed biomass to process fluid effective to enhance interaction between the processed biomass and process fluid.

In still further aspects, the present invention provides a system comprising a reaction apparatus comprising: a reaction tank having an inner surface defining an interior space and configured to hold a process fluid; at least one mechanical rotating device comprising: a submergible chamber configured to operate within reaction fluid contained within the reaction tank, the submergible chamber having an inner surface defining an interior space and comprising a plurality of zones including: a zone (or section) including a rotatable member and configured to process biomass feedstock; and a zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis; and a drive source for driving the shaft about said axis. In some aspects, the chamber may comprise an additional zone with an additional rotatable member for receiving feedstock.

In yet further aspects, the present invention provides a mechanical rotating device configured to operatively couple with a reaction tank, the mechanical rotating device comprising a submergible chamber configured to operate within process fluid contained within the reaction tank, the submergible chamber having an inner surface defining an interior space and comprising a plurality of zones including a zone (or section) including a rotatable member and configured to process biomass feedstock; and a reaction zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis. In some aspects, the shaft may be configured to be driven about said axis using a drive source. In other aspects, multiple mechanical rotating devices may be operated in a single reaction tank or vessel. The disclosed device can be used for various applications in addition to conversion of biomass to biofuel, such as, and without limitation, extraction of lignin, oils, and other components from different biomass types. As will be further described herein, embodiments of the disclosed devices and systems include a reaction zone with an inventive conical design and configuration that can allow for closer and sustained contact between the process fluid and the biomass.

Tight temperature control, among other process conditions, in a process tank or vessel is vital to produce the desired reaction products in the highest yields. In one aspect, a system and method in accordance with the present invention may be configured to avoid the pyrolysis temperature phase. To this end, a 10° C. variation can have a dramatic effect on the results and outcome of the process, such as production of unwanted reaction products and/or lower yields. By way of further example, prior systems often require pumping oil between different process tanks having large temperature ranges, making temperature control problematic while consuming substantial energy. In addition, these prior systems commonly employ a turbine, installed and operated in a loop, from and back to main process tank. This configuration requires additional control, piping system, pump and valves. Furthermore, turbines are installed in a loop outside the process vessels where the temperature of return oil is dependent of flow and energy applied, which is an additional temperature control challenge and source of energy loss.

In one aspect, the present disclosure provides an integrated reaction apparatus comprising: a) a process or reaction tank having an inner surface defining an interior space and configured to hold a reaction or process fluid; and b) at least one mechanical rotating device comprising: a submergible chamber configured to operate within reaction fluid contained within the reaction tank, the submergible chamber having an inner surface defining an interior space and comprising a plurality of zones including: at least one zone or section configured to receive and feed biomass feedstock to an adjacent zone; at least one zone or section configured to process or size reduce biomass feedstock received from an adjacent zone; and at least one zone or section configured to treat or need the size reduced biomass feedstock with process fluid and catalyst under conditions effective to convert at least a portion of the processed biomass feedstock to at least one reaction product. The introduction of the new mechanical rotating device is designed to be submerged in the process tank while being able to feed, size reduce, and knead to achieve improved uniformity of biomass during processing and conversion. The new mechanical rotating device was further designed to treat the biomass in a conical kneading and mixing zone, as detailed herein.

In another aspect, the present disclosure provides a system for converting biomass to biofuel, the system comprising at least one reaction apparatus. In further aspects, a reaction apparatus may comprise: a) a reaction tank having an inner surface defining an interior space and configured to hold a reaction or process fluid; b) at least one mechanical rotating device comprising: a submergible chamber configured to operate within reaction fluid contained within the reaction tank, the submergible chamber having an inner surface defining an interior space and comprising a plurality of zones including: a first zone (or section) including a first rotatable member and configured to receive biomass feedstock; a second zone (or section) including a second rotatable member and configured to process biomass feedstock from the first feeding zone; and a third reaction zone (or section) including a third rotatable member and configured to treat the processed biomass feedstock effective to convert at least a portion of the processed biomass feedstock to at least one reaction product; a shaft in operable communication with each of the first, second, and third rotatable members for rotating said rotatable members about an axis; and a drive source for driving the shaft about said axis. In further aspects, the system may further comprise a biomass feed module, a distillation module, and/or a biofuel polishing module.

In further aspects, the system or apparatus may comprise a plurality of mechanical rotating devices. In still further aspects, the plurality of zones may comprise at least one of: a feeding zone, a processing zone and/or reaction zone, or combinations thereof. In yet further aspects, a first zone may comprise a first feeding zone (or section) including a first rotatable member and configured to receive biomass feedstock. In even further aspects, a second zone may comprise a first processing zone (or section) including a second rotatable member and configured to process or size reduce biomass feedstock from the first feeding zone. In still further aspects, a third zone may comprise a first reaction zone (or section) including a third rotatable member and configured to treat or knead the processed biomass feedstock under conditions effective to convert at least a portion of the processed biomass feedstock to at least one reaction product, for example, in the presence of process liquid, catalyst, and/or lime. To this end, a reaction zone may comprise or otherwise contain catalyst and lime. In an illustrative embodiment, the catalyst is zeolite.

In further aspects, at least one zone may comprise a feed section configured to receive and feed biomass feedstock to an adjacent zone. In still further aspects, at least one zone may comprise a size reduction section configured to size reduce biomass feedstock received from another zone. In even further aspects, at least one zone may comprise a kneading section configured to knead the processed biomass feedstock with catalyst and reaction fluid under conditions effective to convert at least a portion of the processed biomass feedstock to at least one reaction product.

In various aspects, the plurality of zones may be in a stacked configuration. To this end, a first zone may be in fluid communication with the second zone, and/or a second zone may be in fluid communication with the third zone. For example, a first feeding zone may be in fluid communication with a first processing zone, and/or a first processing zone may be in fluid communication with a first reaction zone, and so on.

In further aspects, each zone or section may comprise at least one rotatable member. In still further aspects, a rotatable member may comprise a feed screw, rotor, or the like. In yet further aspects, a rotatable member may comprise a surface profile defined by one or more blades, teeth, or fins disposed on an outer surface. In some aspects, a blade may comprise a spiral blade. In further aspects, a first rotatable member may comprise a feed screw configured to move biomass feedstock from a feeding zone into a processing zone, such as for size reduction. A second rotatable member may comprise a cylindrical rotor configured to process the biomass feedstock, for example, by size reducing the biomass. In still further aspects, a third rotatable member may comprise a conical rotor configured to facilitate conversion of the processed biomass feedstock into at least one reaction product, for example, by kneading the size reduced biomass with process fluid and catalyst. To this end, conditions may start a catalytic reaction which extracts the oxygen content from the biomass feed material, in form of $CO_2$, water and the formation of oil without any oxygen content.

In further aspects, at least one zone or section may comprise a processing section or processing zone having a rotatable member configured to size reduce biomass feed, for example, prior to introduction of the biomass into an adjacent zone or section.

In still further aspects, at least one zone or section may comprise a reaction section or reaction zone having a conical design and configuration, such as, for example, employing a conical rotatable member configured to increase retention time of biomass within the zone. The inventive conical design and configuration employed in various zones and section of the disclosed devices and systems can function to extend the retention (e.g., kneading) time in the device chamber by separating of the biomass feed material by density. For example, in a cylindrical section, as the rotation speed of a shaft and rotors are increased, retention time is shortened. However, in the conical section, the biomass material density separation is higher and retention time is dependent on the production or conversion rate.

In further aspects, the apparatus or system may comprise conditions effective to convert at least a portion of the processed biomass feedstock to one or more desired reaction products. In still further aspects, conditions effective may comprise: atmospheric pressure, alkali conditions, process and/or temperature range: 250-350° C., or combinations thereof. In some specific embodiments, conditions effective to convert at least a portion of the processed biomass feedstock may comprise: a process pressure of about 17 MPa (2465 psig), a biomass conversion time of about 30 minutes, and at a temperature of about 280° Celsius. (536° F.). In yet further aspects, conditions effective to convert at least a portion of the processed biomass feedstock may comprise a conical configuration or construction in a reaction zone of the chamber for increasing retention time of biomass within said zone.

In further aspects, biomass may comprise any cellulosic organic material. In even further aspects, biomass can also include: commercial or recycled material including plastic, paper, paper pulp, cardboard, sawdust, timber residue, wood shavings and cloth; agricultural waste such as sugar cane, shells, coffee grounds; and agricultural feed products. Biomass is typically comprised of a wide array of compounds classified within the categories of cellulose, hemicelluloses, lignin, starches, and lipids. In still further aspects, reaction or end product of the present invention may comprise at least one of biofuel, water, char, ash, and/or carbon dioxide, and combinations thereof. The disclosed method and system may break down the long carbon molecules by removal of oxygen into water and carbon dioxide.

In still further aspects, the biofuel may comprise renewable liquid fuel. The renewable liquid fuel may be in the diesel boiling range. In some aspects, the renewable liquid fuel may comprise diesel fuel.

In further aspects, the apparatus and system may include a drive source for driving the shaft, and any component in operable or mechanical communication thereof. In still further aspects, the drive source may comprise a motor, such as an electric motor or gas motor, or the like. In some aspects, each of the rotatable members may be driven by the same drive source. In still further aspects, the apparatus and system may comprise a power source. The power source may comprise a generator, for example, a diesel generator. In some aspects, the power source may comprise a diesel generator configured to operate using biofuel produced by the system. To this end, the disclosed system can be configured to generate its own electricity and power requirements. Further, the exhaust stream from the generator can be used to heat the process fluid and/or biomass drying. For example, if 100 l/hour of the produced biofuel is used, 436 kWh of electricity may be generated at a 43% generator conversion rate (83 kg/h=3652000 KJ). The exhaust stream from the generator diesel engine, having temperature of 550° C., may be temperature reduced to about 325° C. (41% or 208 kWh) to heat the process oil, and the remaining heat may be used for biomass drying. Still further, any excess electricity may be put onto the electric grid.

In further aspects, the apparatus and system may include at least one of: a separation module, a distillation module, a biomass feed module configured to dispense biomass feedstock into the system, and/or a biofuel polishing module. A separation module may comprise one or more of: a separation tower, condenser, and/or measuring pipe, or combinations thereof. A distillation module may comprise one or more of: a distillation tower, condenser, and/or measuring pipe, or combinations thereof. A biomass feed module may comprise a biomass feed bin, biomass feed screw or conveyor, and/or biomass heater, or combinations thereof.

In further aspects, each of the rotatable members of the mechanical rotating device are configured to pivotably rotate about an axis. Each of the zones and rotatable members may comprise specific component characteristics and configuration, such as, for example, size and dimensions, that can be configured to adjust for intended function, and other factors to achieve optimal process parameters, reaction products and/or product yield. In further aspects, features of the system and components may be configured or utilized to set and/or control the characteristics. For example, at least one of the following may be configured: the type of material used for the components; the member dimensions (e.g., height, width, thickness, shape, fin or surface profile, etc.); location of the member; and the like.

In further aspects, while certain components of the disclosed system described herein can be permanently mounted in or on a component, this is not a requirement. For example, the rotatable member can be configured to be removably attached to the shaft, e.g., to allow interchange and/or replacement rotatable members in each zone. Such configurations allow workers, or others to select desired properties or levels in a zone, e.g., for customization purposes, for process preferences, to match desired use conditions, biomass physical characteristics, or to repair or replace defective or damaged components, etc. Further, since the mechanical rotating device can be configured to be removably installed in existing process vessels, the present disclosure also provides a retrofittable integrated reactor comprising the components of the integrated reactor apparatus, such as the mechanical rotating device.

In various aspects, the components of the disclosed system and components can be detachably attached. In further aspects, the components can be connected by a connecting means. In still further aspects, the connecting means can comprise a fitting, insert, adhesive, brazing, soldering, welding, spot weld, screw with nut, rivet, threading, friction fit, snap-fit, twist-lock, or interlocking mechanism or a combination thereof. In yet further aspects, the connection can be achieved using a snap, friction fitting, snap ring, O-ring, pressure fitting, clip, clasp, and the like. The snap ring or O-ring can be retained within a groove to accommodate the snap ring or O-ring. In a further aspect, the system can comprise an engagement means for coupling and holding components together. In a further aspect, the engagement means can be a screwing mechanism, a click-lock mechanism, or friction mechanism, or the like. In still further aspects, the system components can be integrally or mechanically attached to other components. In a yet further aspect, the disclosed components can be connected, attached, or mounted using a connecting means, the connecting means comprising a fitting, insert, adhesive, brazing, soldering, welding, spot weld, screw with nut, rivet, fitting, insert, threading, friction fit, or snap-fit or a combination thereof.

In various aspects, advantages of the disclosed apparatuses and systems employing the submerged mechanical rotating device include at least one of: Lower total process energy requirements; Expected higher product yield; Lower heat losses; Improved process temperature control; Simplified system and operation; No requirement for pipes, valves between process tanks; Smaller system footprint; Lower equipment and installation cost; Agitation of the process tank; and Fewer control loops.

In further aspects, the disclosed methods and systems provide advantages over pyrolysis-based methods and systems that can include one or more of the following: Atmospheric pressure and Alkali conditions; High conversion of the biomass heat value to diesel; Fewer process steps; Lower cost compared to the pyrolysis-based processes; Compact installation, small footprint; Production of biofuel with a high cetane value as a finished product which can be used as transport fuel; process outputs of biodiesel, distilled water, ash and CO2; Biodiesel produced from the biomass (cellulosic feed) is similar to petroleum diesel, but exhibits higher cetane numbers, lower cold pour point and no aromatics; biofuel produced can be used in any proportion in today's infrastructure from pipelines and storage to gas pumps and automobiles/engines; biofuel produced can be blended with petroleum diesel in any proportion; biofuel produced can have excellent stability and is not oxygenated.

C. System Configuration

According to various aspects of the invention, the methods, apparatuses, devices and systems of the present disclosure can comprise multiple configurations. FIGS. 1-9 illustrate non-limiting examples of embodiments of operating environments, mechanisms, and components for the disclosed devices and systems. Although the operating environments, mechanisms, and components are disclosed with specific functionality, it should be understood that functionality may be shared between mechanisms and/or components, with some functions split between mechanisms and/or components, while other functions duplicated by the mechanisms and/or components. Furthermore, the name of the mechanisms and/or components should not be construed as limiting upon the functionality of the mechanisms and/or components. Moreover, each stage in a method or claim language can be considered independently without the context of the other stages. Each stage may contain language defined in other portions of this specifications. Each stage disclosed for one mechanism and/or component may be mixed with the operational stages of another mechanism and/or component. Each stage can be claimed on its own and/or interchangeably with other stages of other mechanisms and/or components.

Figure 1B:
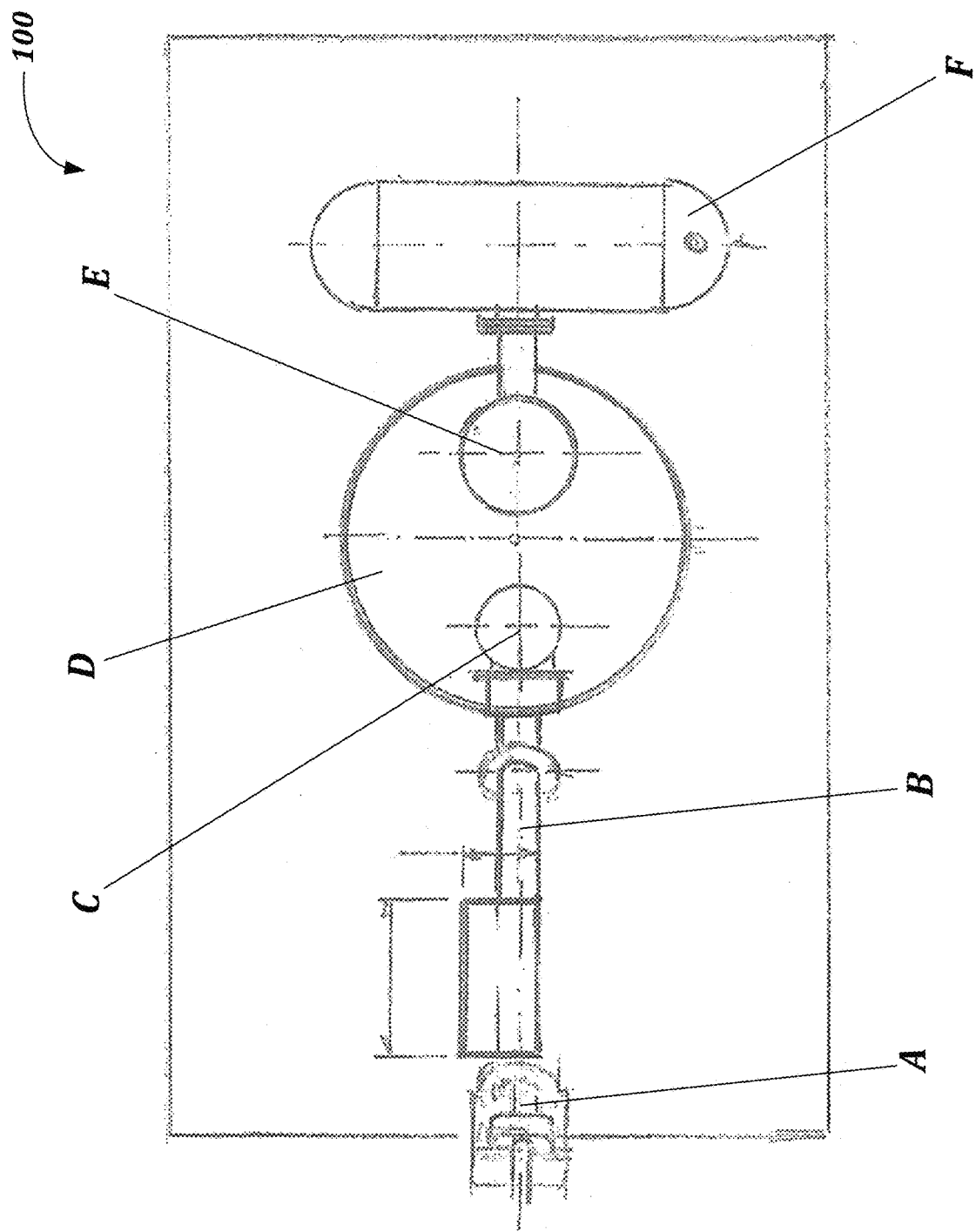

FIGS. 1A-1B show an illustrative embodiment of a system 100 for converting biomass to biofuel in accordance with the present invention. System 100 includes biomass feed module including biomass feed bin (A) and biomass feed screw (B); reaction apparatus including: mechanical rotating device (C) and reaction tank (D); and separation module including: separation tower (E), condenser (F) of water and liquid biofuel, and measuring pipe (G) for condensate from condenser.

Figure 2A:
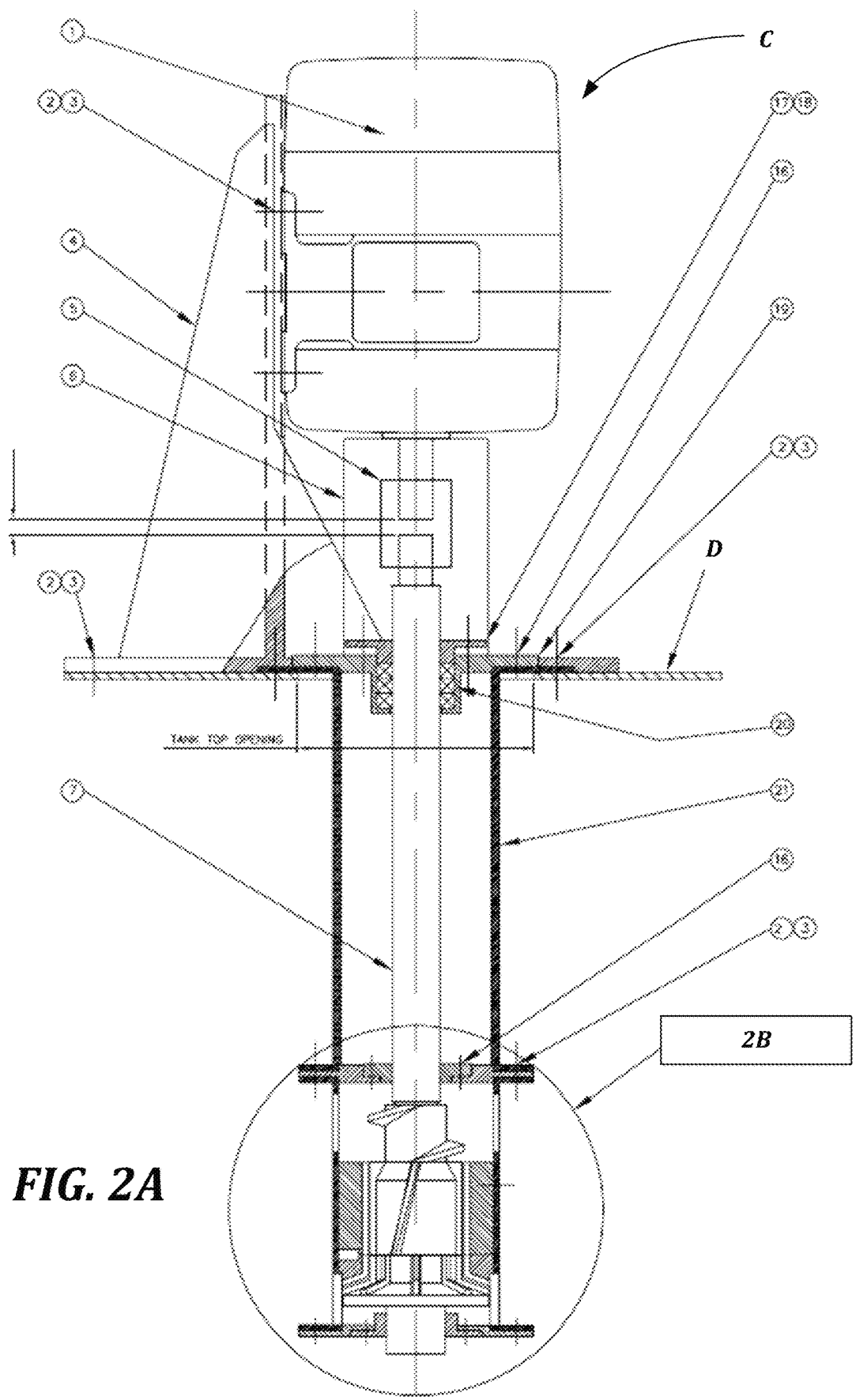
FIGS. 2A-2B shows depictions of an integrated reaction apparatus from a system for producing biofuel in accordance with an illustrative embodiment of the present disclosure.
Figure 2B:
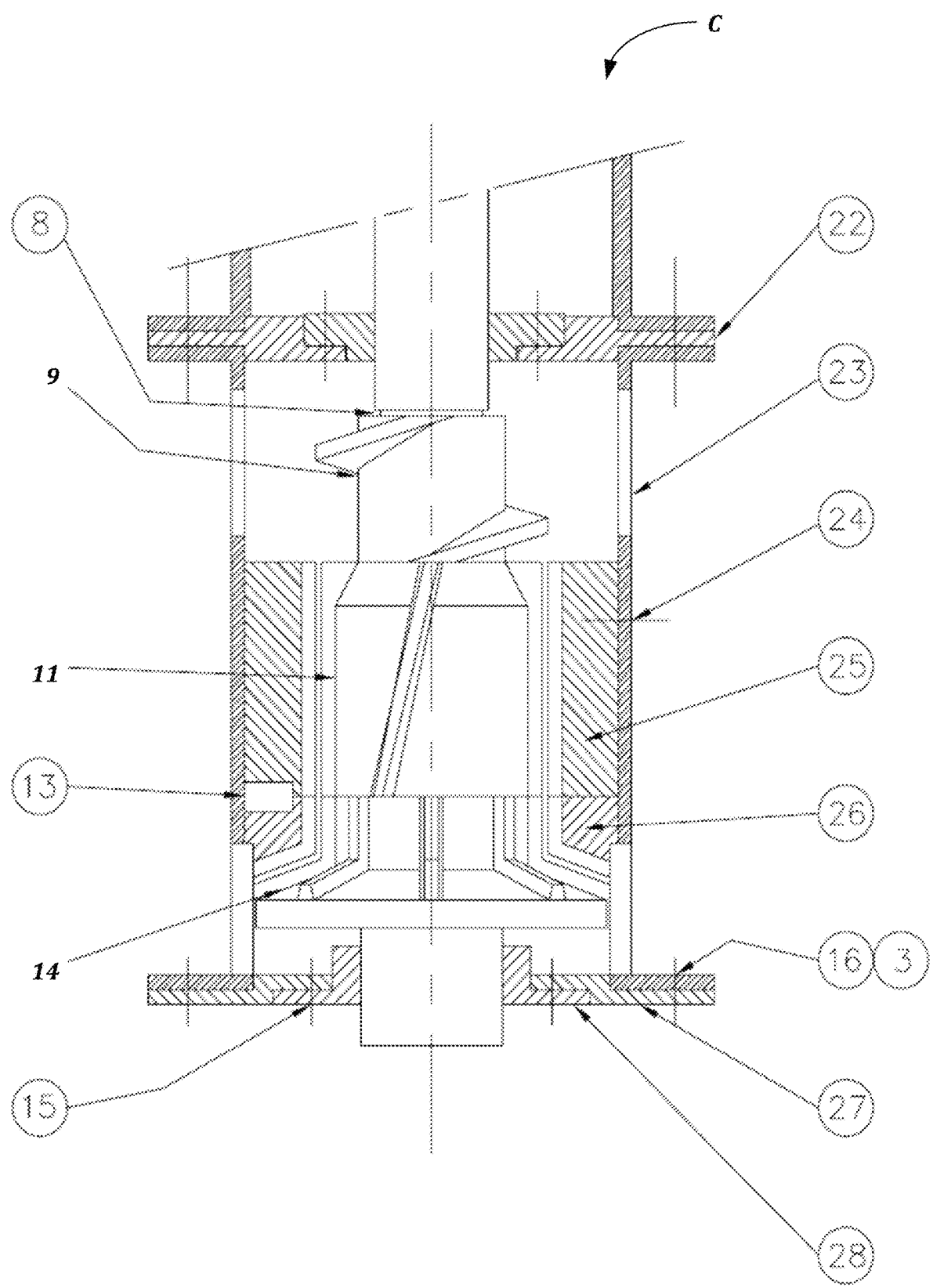

FIGS. 2A-11D depicts various views and components of mechanical rotating device (C) for use in the disclosed reactor apparatus and system 100 in accordance with an illustrative embodiment of the present invention. FIGS. 2A-2B provides side section views of mechanical rotating device (C) including lower housing (23) which defines a submergible chamber configured to operate within reaction fluid contained within the reaction tank (D), the submergible chamber having an inner surface defining an interior space and comprising a plurality of chamber zones including first feed zone with first rotatable feed screw member (9) and configured to receive biomass feedstock; second processing zone with rotatable cylindrical rotor (11) and cylindrical stator (25), which are configured to process biomass feedstock from first feeding zone; third reaction zone with rotatable conical rotor (14) and conical stator (23), which is configured to treat the processed biomass feedstock by kneading it with process oil and catalyst under conditions effective to convert at least a portion of the processed biomass feedstock to at least one reaction product; shaft (7) traveling through spacer housing (21) and in operable communication with each of the first, second, and third zones for rotating rotatable members about an axis; and electric motor (1) for driving the shaft about said axis. As shown, third zone or section comprises a has an inventive conical design and configuration, employing a conical rotatable member configured to increase retention time of biomass within the zone.

This inventive conical design and configuration can function to extend the retention (e.g., kneading) time in the device chamber by separating of the biomass feed material by density. For example, in a cylindrical section, such as the preceding second zone, as the rotation speed of a shaft and rotors are increased, retention time is shortened. However, in the conical third section, the biomass material density separation is higher and retention time is dependent on the production or conversion rate. Alternative conical arrangements and configurations may be employed for increasing retention time of the biomass in the specific zone, such as members that may be fixed to the chamber housing.

The submergible chamber interior space may be sealed at the top by middle cover (22) and at the bottom using lower housing cover (27), and may include various inlet and outlet ports used during biomass feedstock processing. In various embodiments, the lower portion of mechanical rotating device (C) can be configured to be submerged within reaction tank (D) containing reaction or process fluid for reacting with the biomass feedstock. The reaction fluid can comprise process oil. Reaction tank (D) may include at least one fluid inlet port and fluid outlet port. However, in some embodiments fluid intake and removal may occur through a shared port. In other embodiments, there may be a plurality of ports. Any number of additional ports may also be provided, each of which may be used to insert or attach features for viewing the interior of the cartridge or for the measurement of parameters such as, for example, temperature, pressure, or fluid composition. In an illustrative embodiment, process fluid and biomass may enter through four inlet ports at the top of the chamber housing. In some aspects, inlet ports may be located in the area around the feeding or first section of the mixer/reaction chamber. During operation, the biomass and process fluid are forced downwards through the various zones, by rotating feed section, the cylindrical the conical section, and internal rotor parts. Discharge from the mixer chamber may be through four discharge ports at the lower part of the housing area.

In an example embodiment, components of mechanical rotating device (C) shown in the figures may include one or more of the following:

ELECTRIC MOTOR (1);
BOLT (2);
NUT (3);
10202 MOTOR SUPPORT (4),
COUPLING (5), Double Disc;
COUPLING GUARD (6);
SHAFT (7);
SNAP RING, EXTERNAL (8);
FEED SCREW (9);
CYLINDRICAL ROTOR (11);
KEY, ONE END ROUNDED (13);
CONICAL ROTOR (14);
BOLT (15);
BOLT (16);
PACKING GLAND (17);
BOLT (18);
PACKING BOX (19);
PACKING (20);
SPACER HOUSING (21);
MIDDLE COVER (22);
UNIT HOUSING (23);
BOLT (24);
CYLINDRICAL STATOR (25);
CONICAL STATOR (26);
10313 LOWER HOUSING COVER (27);
10314 LOWER BUSHING (28).

In various embodiments, feed screw and/or rotors may comprise a key, such as key with both or one end rounded, such as KEY, ONE END ROUNDED (13).

Figure 3A:
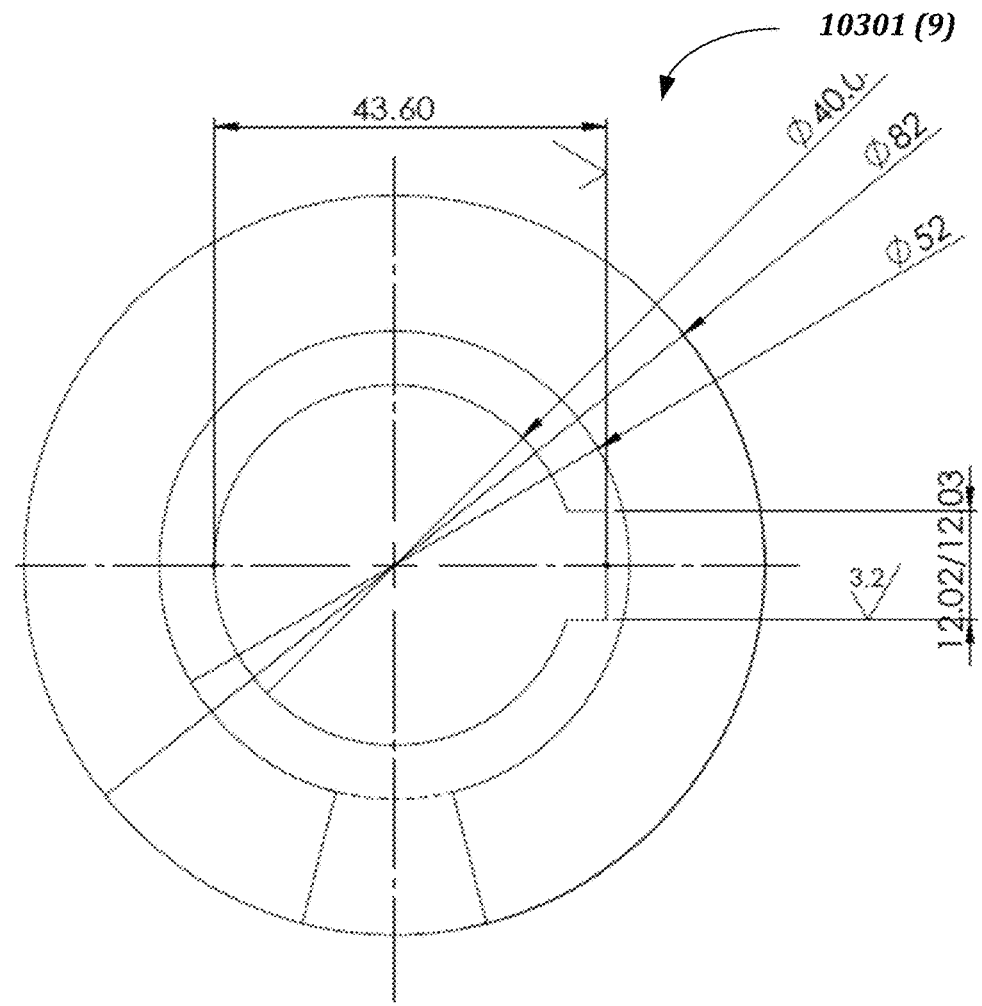
FIGS. 3A-3C shows various view of a feed screw from a mechanical rotating device in accordance with an embodiment of the present invention.
Figure 3B:
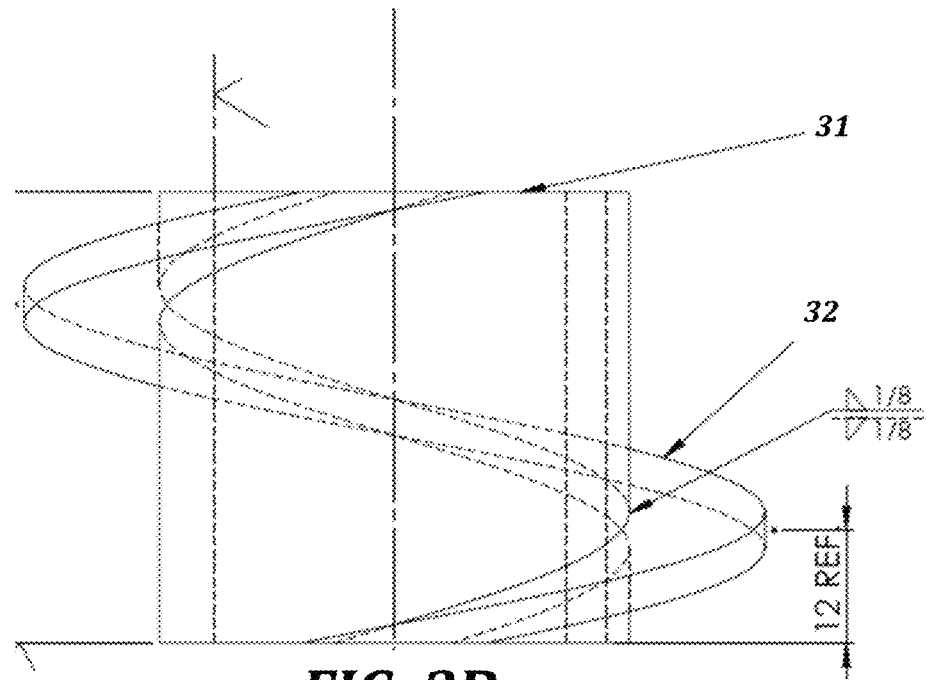
Figure 3C:
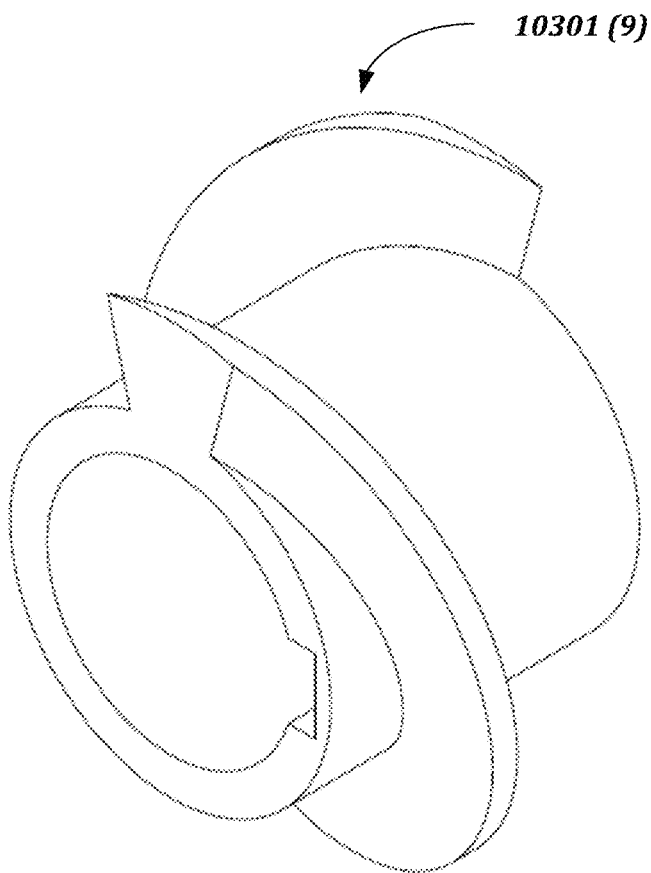
Figure 4A:
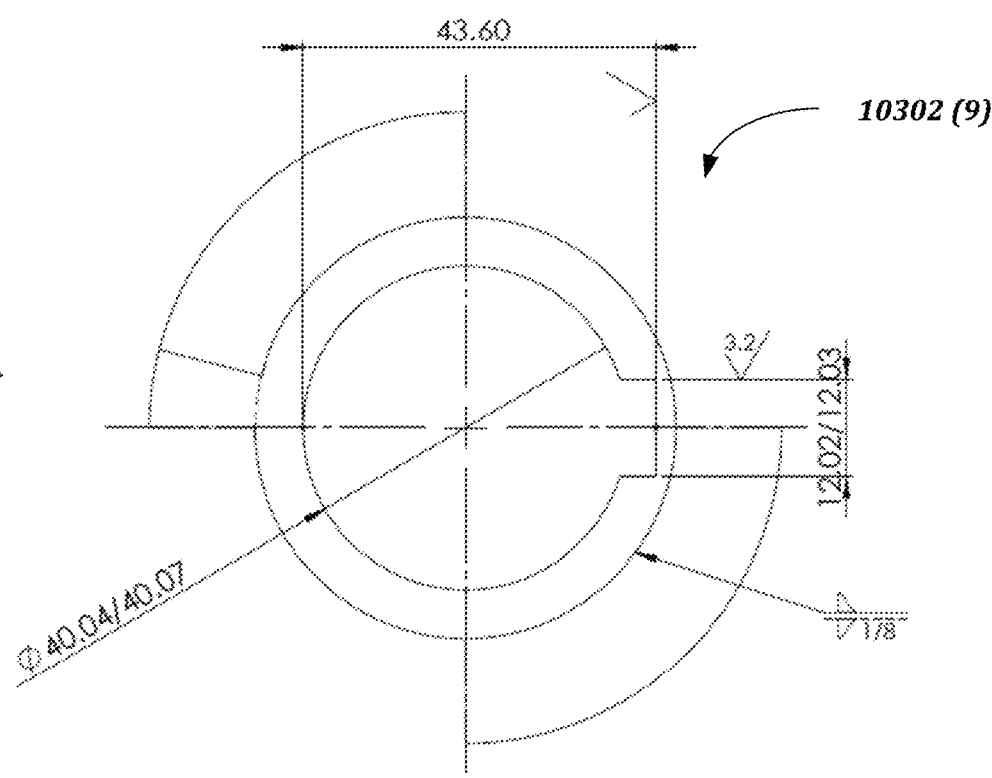
FIGS. 4A-4C shows various view of a feed screw from a mechanical rotating device in accordance with another embodiment of the present invention.
Figure 4B:
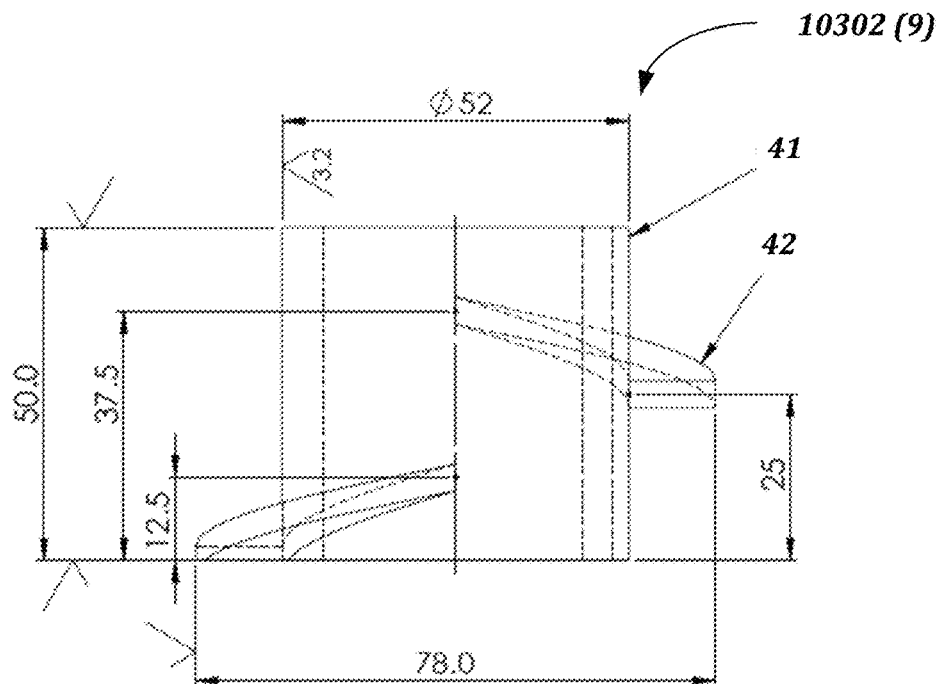
Figure 4C:
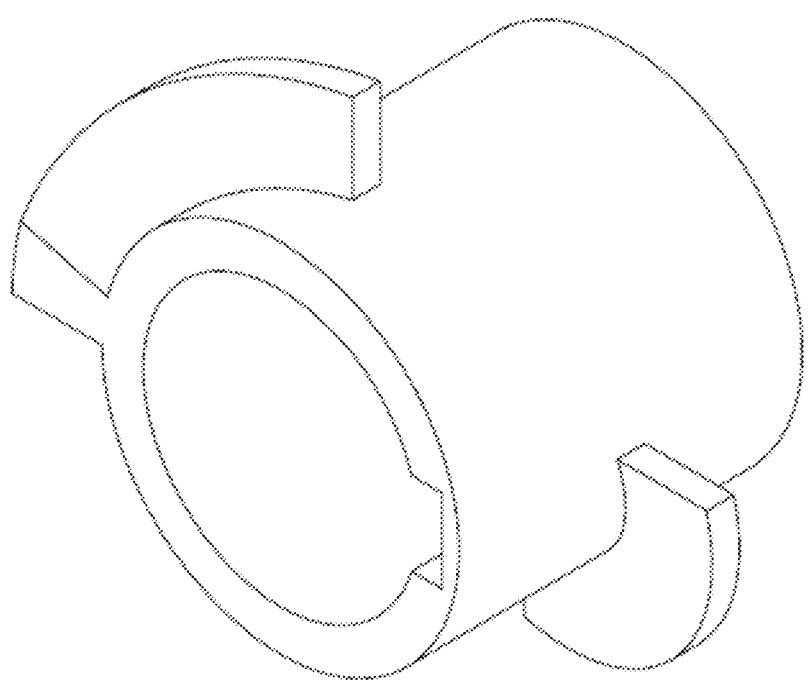

FIGS. 3A-3C shows various view of FEED SCREW 10301, Alternative 1(9) from mechanical rotating device (C) in accordance with an embodiment of the present invention. FIG. 3A shows a top view, FIG. 3B shows a front view depicting bar element 31 and plate element 32, and FIG. 3C show an isometric view. FIGS. 4A-4C shows various view of FEED SCREW 10302, Alternative 2(9) from mechanical rotating device (C) in accordance with another embodiment of the present invention. FIG. 4A shows a top view, FIG. 4B shows a front view depicting bar element 41 and plate element 42, and FIG. 4C show an isometric view.

Figure 5A:
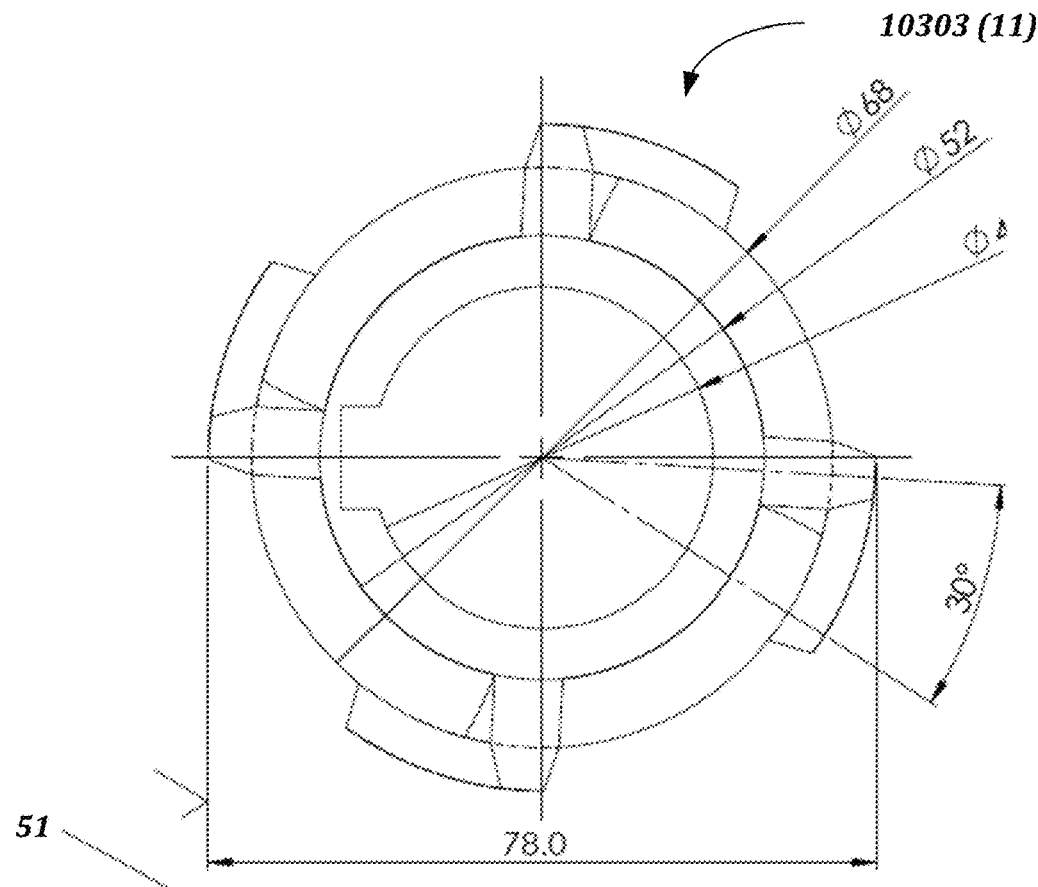
FIGS. 5A-5C shows various view of a cylindrical rotor from a mechanical rotating device in accordance with an embodiment of the present invention.
Figure 5B:
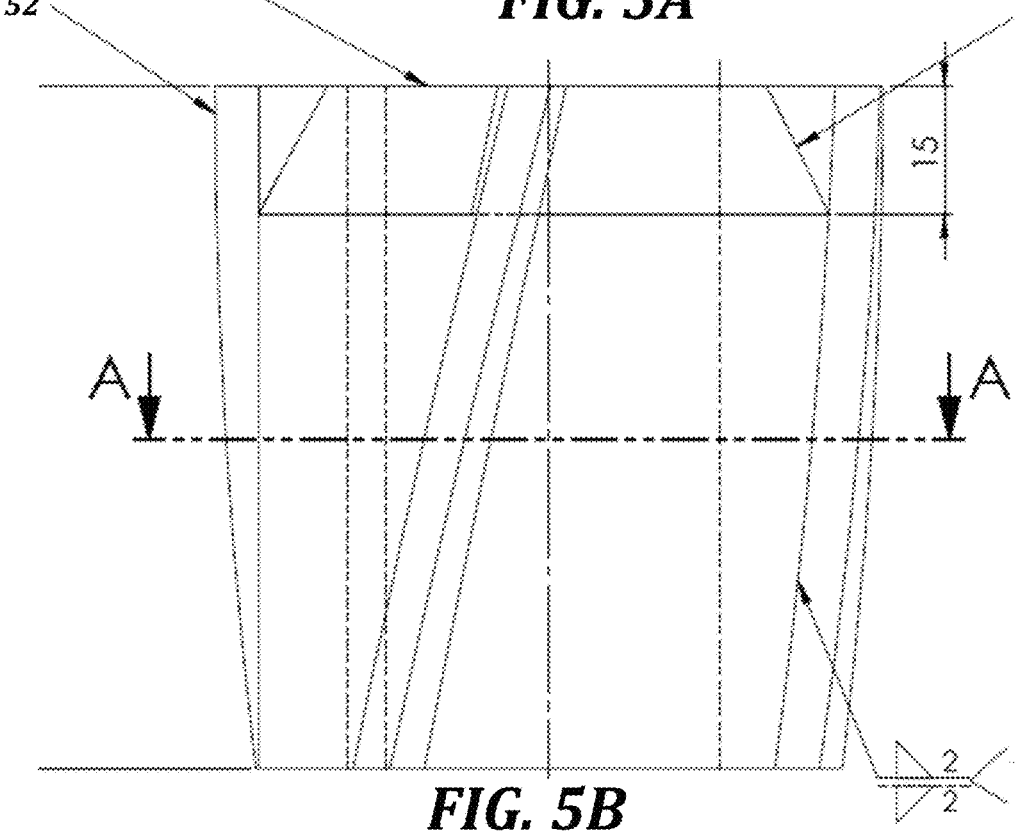
Figure 5C:
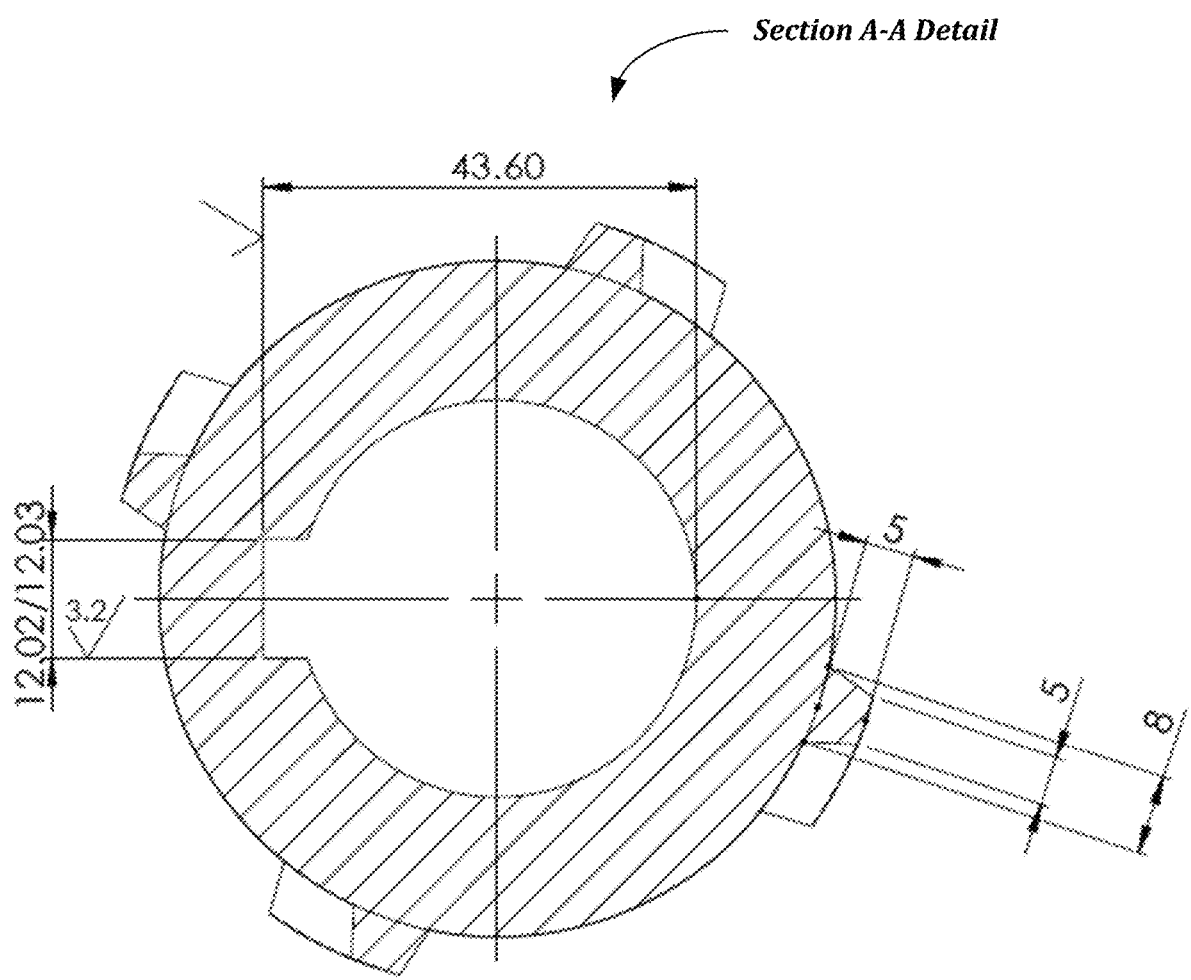
Figure 6A:
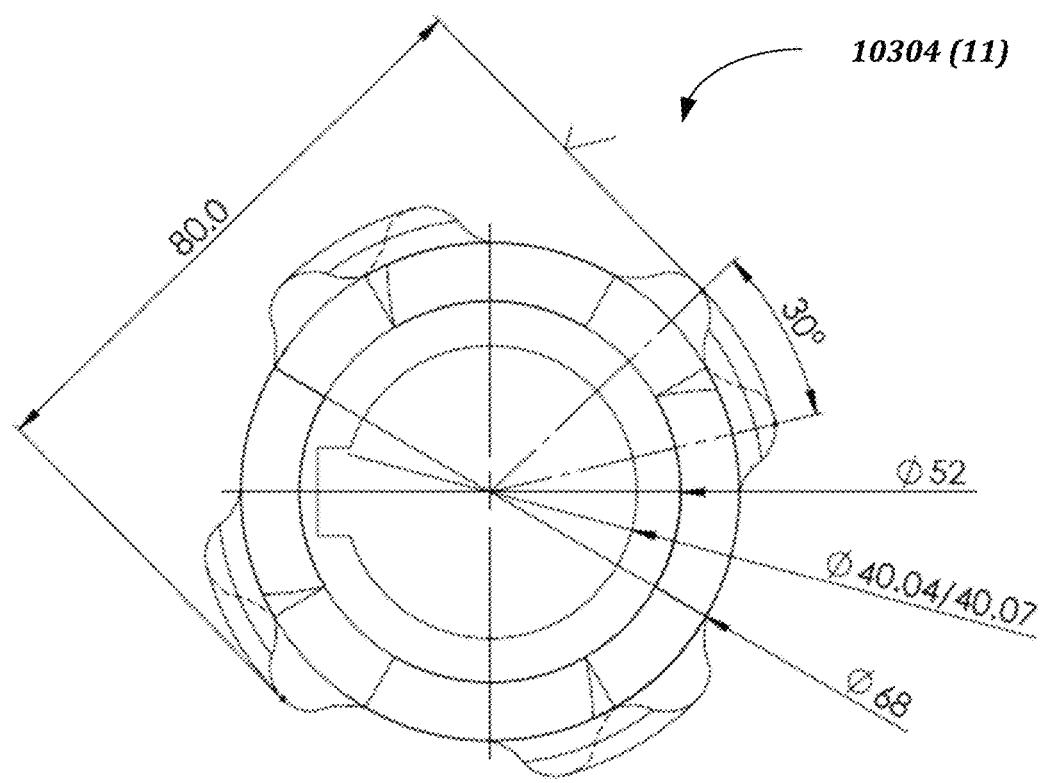
FIGS. 6A-6D shows various view of a cylindrical rotor from a mechanical rotating device in accordance with an embodiment of the present invention.
Figure 6B:
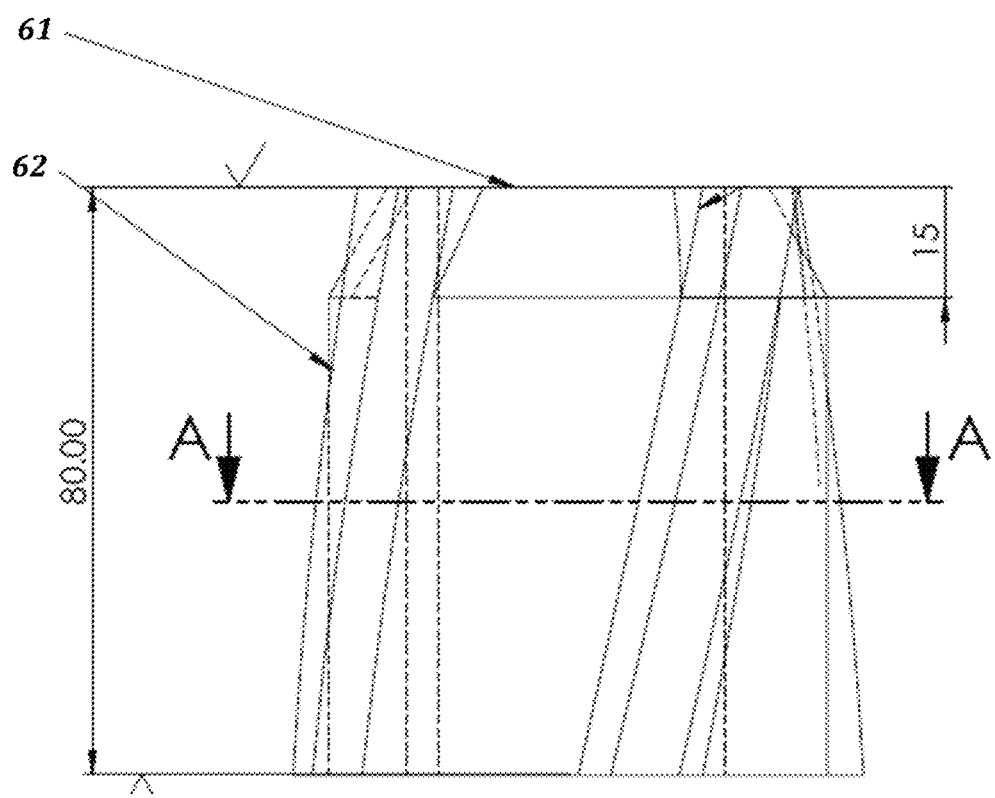
Figure 6C:
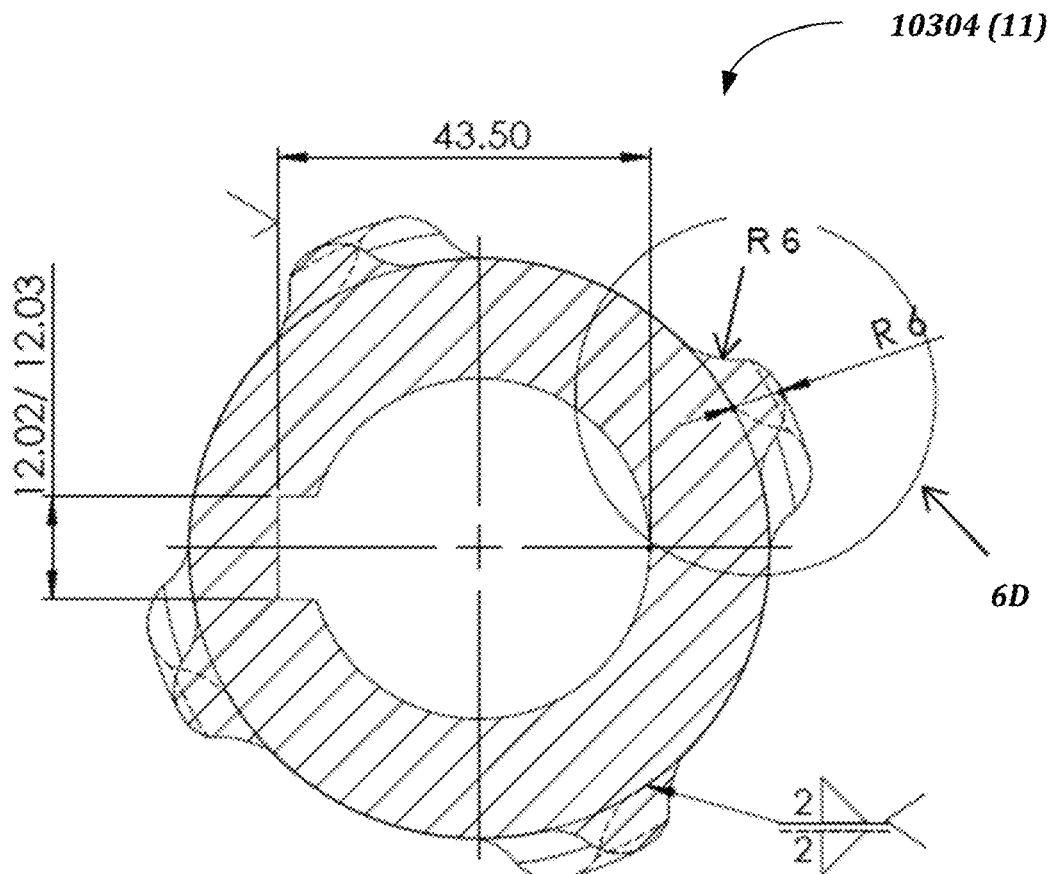
Figure 6D:
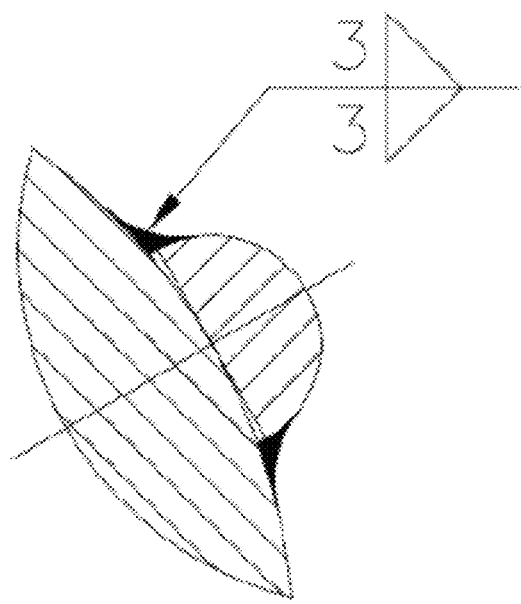

FIGS. 5A-5C shows various view of CYLINDRICAL ROTOR, A01 10303 (11) from mechanical rotating device (C) in accordance with an embodiment of the present invention. FIG. 5A shows a top view thereof, FIG. 5B shows a front view depicting first bar element 51 and second bar element 52 on surface profile, and FIG. 5C show a section view of A-A from FIG. 5B. FIGS. 6A-6D shows various view of CYLINDRICAL ROTOR A02 10304 (11) from mechanical rotating device (C) in accordance with another embodiment of the present invention. FIG. 6A shows a top view thereof, FIG. 6B shows a front view depicting first bar element 61 and multiple second bar elements 62 on surface profile, FIG. 6C show a section view of A-A from FIG. 6B, and FIG. 6D show a detail view 6D from FIG. 6C.

Figure 7A:
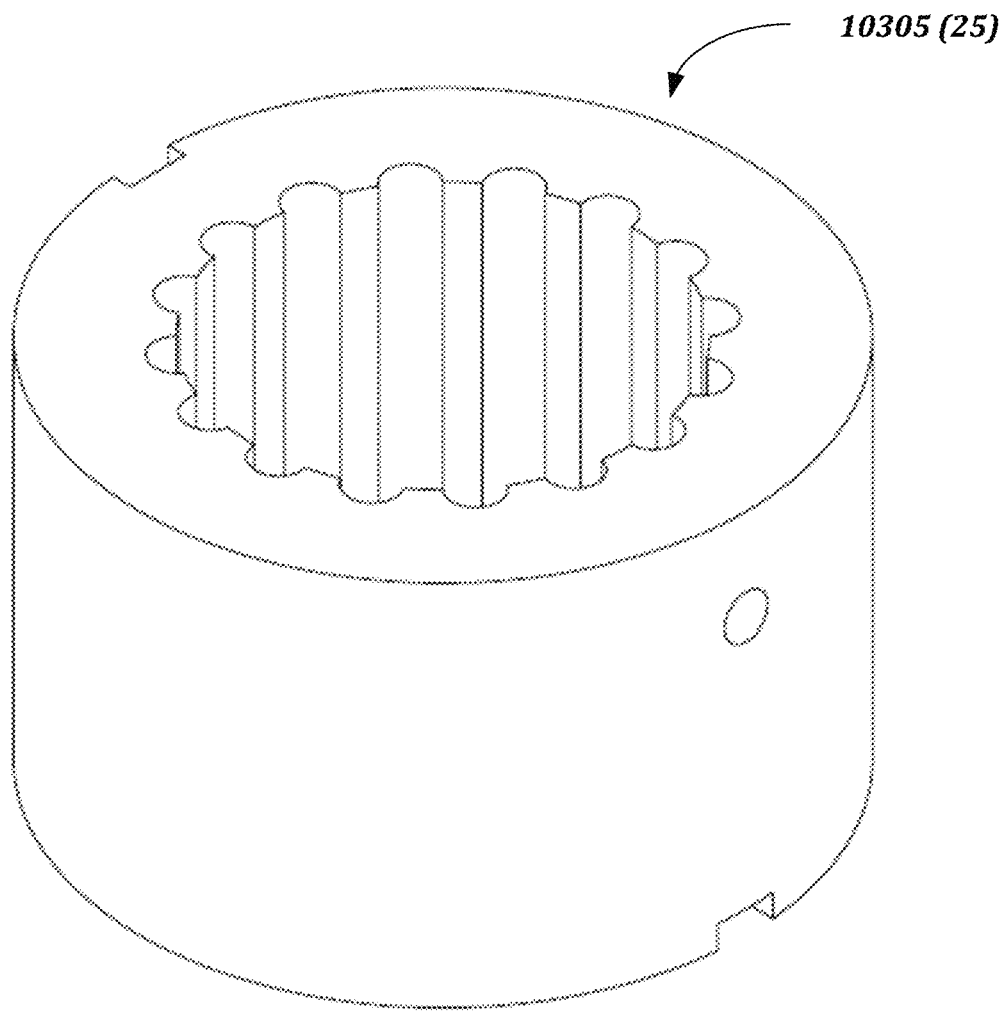
FIGS. 7A-7D shows various view of a cylindrical stator from a mechanical rotating device in accordance with another embodiment of the present invention.
Figure 7B:
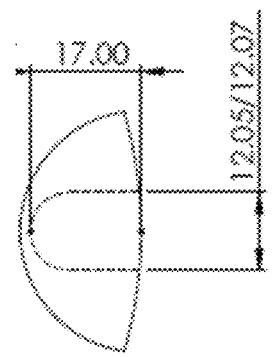
Figure 7C:
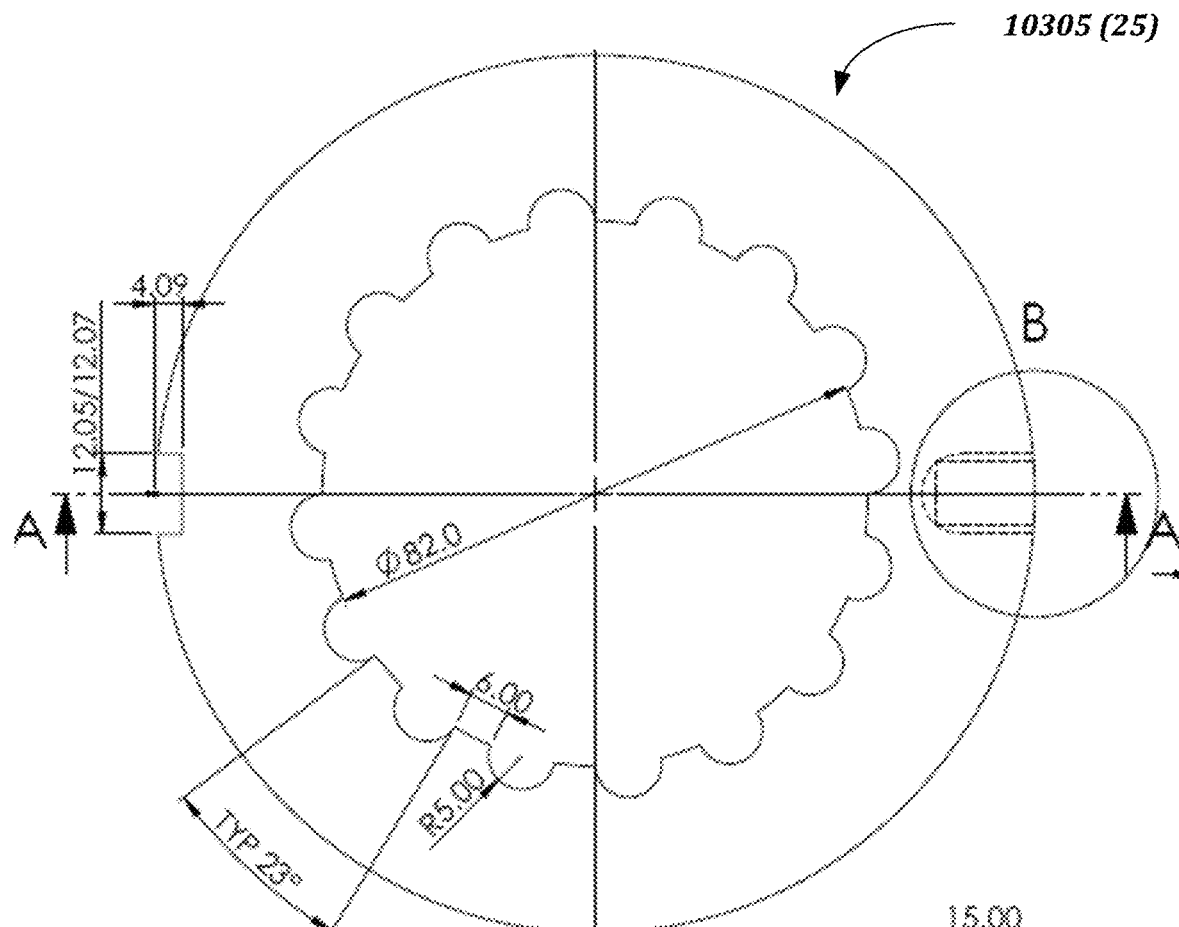
Figure 7D:
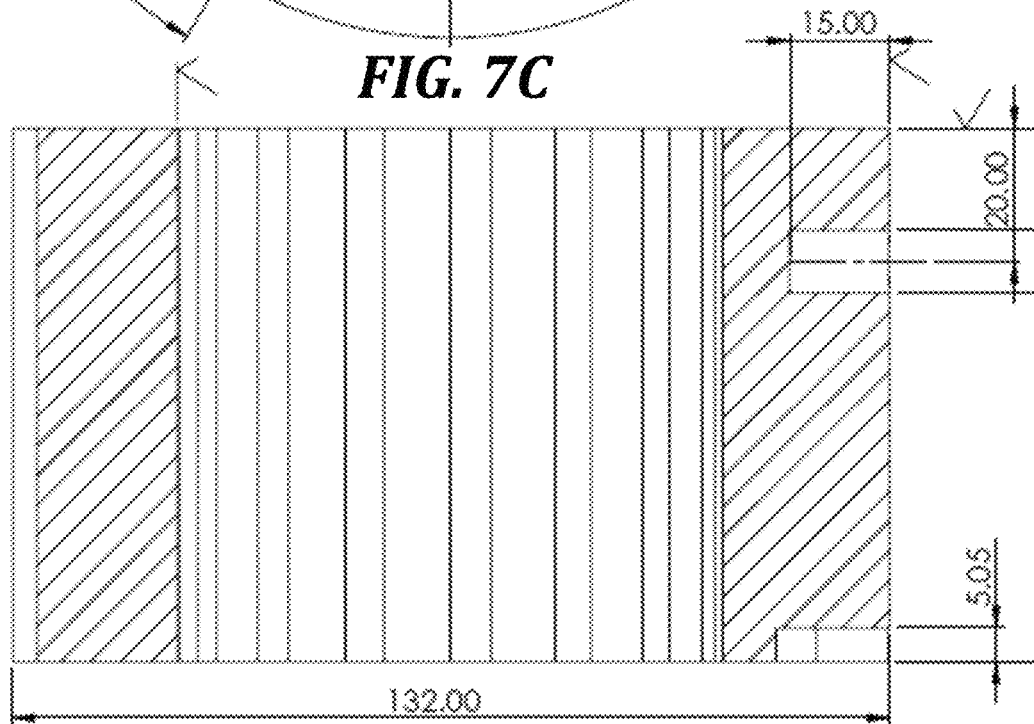
Figure 8A:
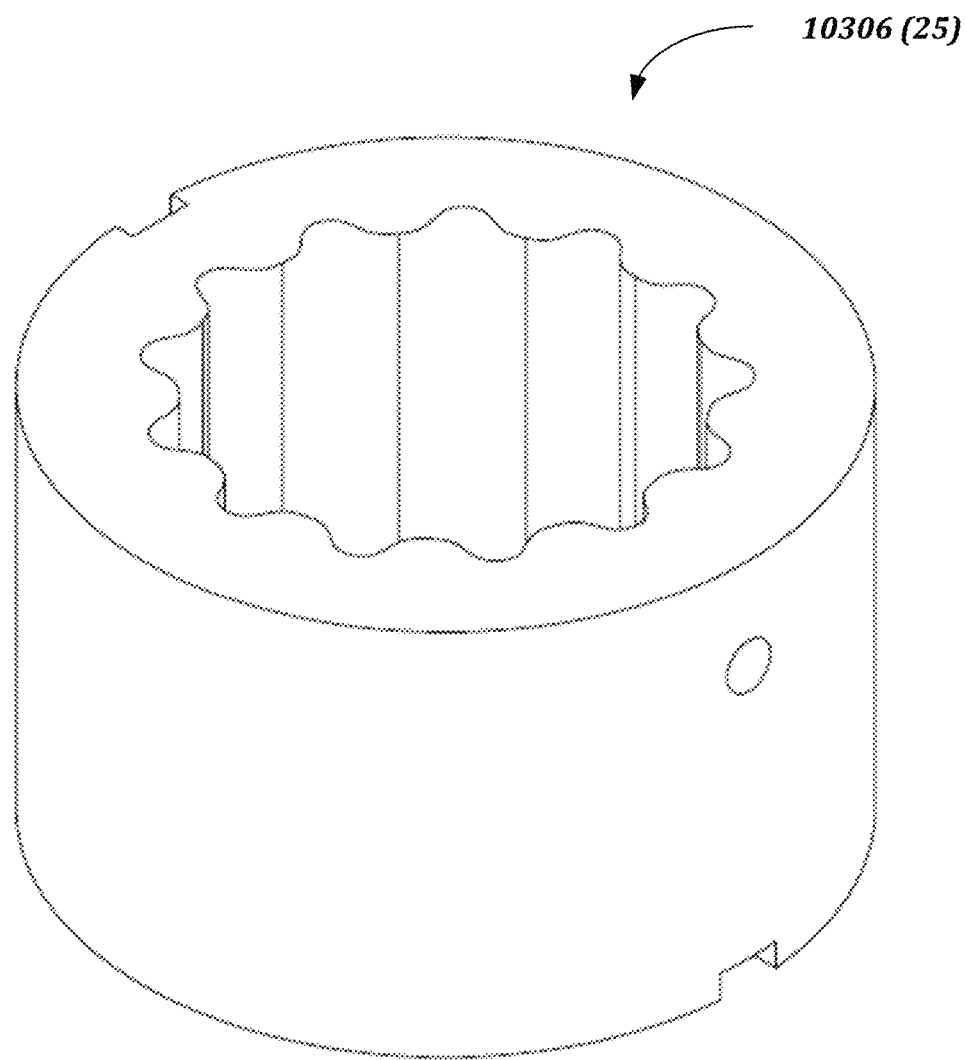
FIGS. 8A-8E shows various view of a cylindrical stator from a mechanical rotating device in accordance with an embodiment of the present invention.
Figure 8B:
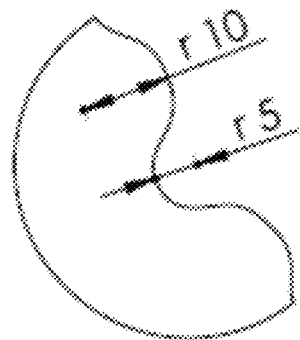
Figure 8C:
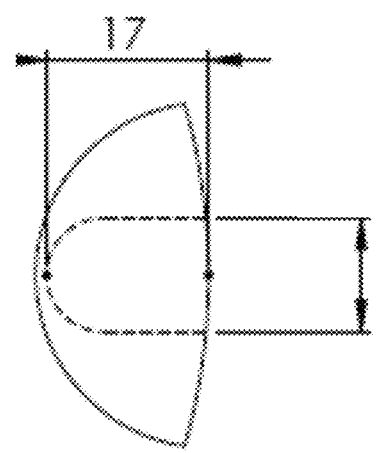
Figure 8D:
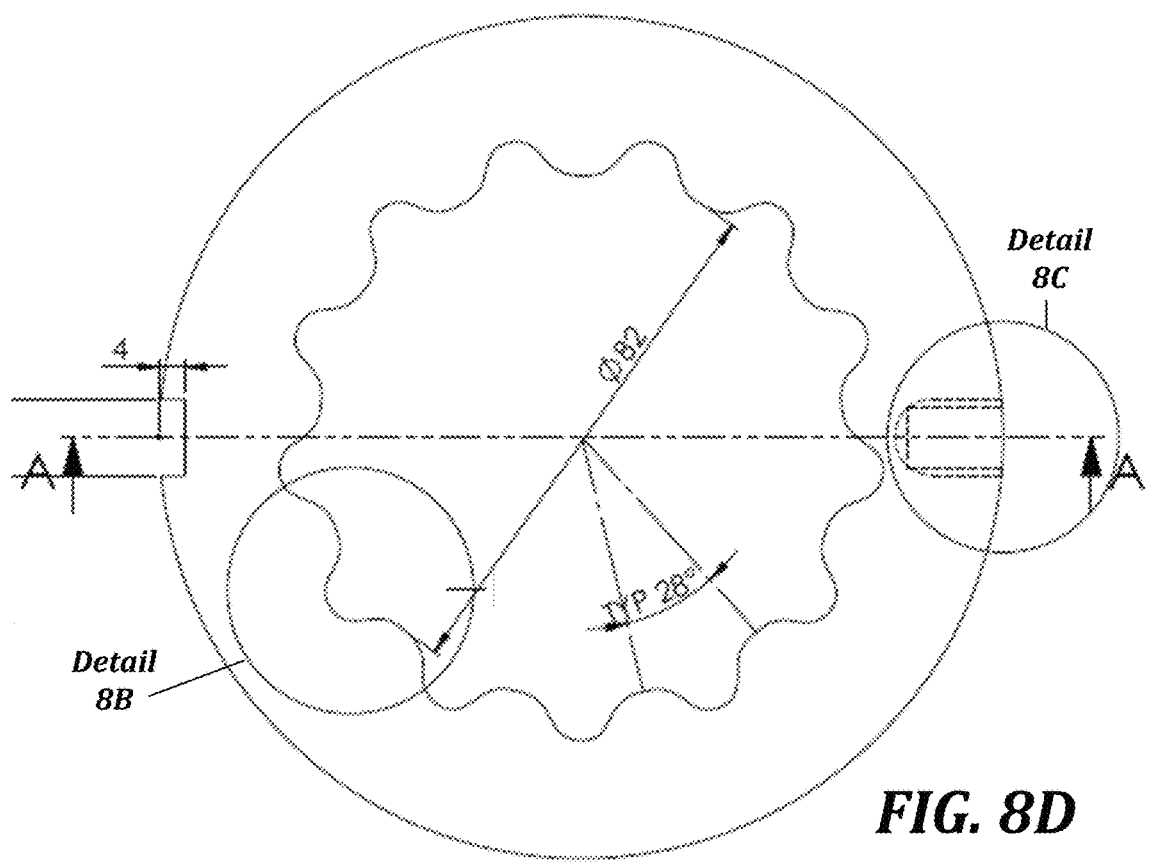
Figure 8E:
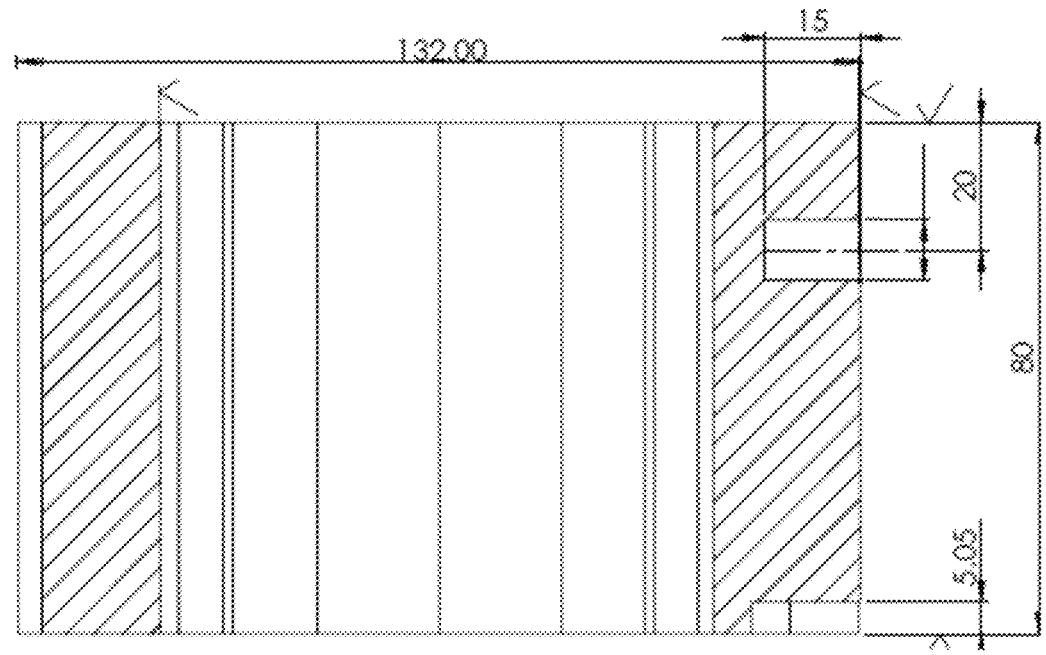

FIGS. 7A-7D shows various view of CYLINDRICAL STATOR A01 10305 (25) from mechanical rotating device (C) in accordance with an embodiment of the present invention. FIG. 7A shows an isomeric view thereof, FIG. 7B shows detail view from FIG. 7C, which shows a top view, and FIG. 7D show a section view of A-A from FIG. 7C. FIGS. 8A-8E shows various view of CYLINDRICAL STATOR B01 10306 (25) from mechanical rotating device (C) in accordance with another embodiment of the present invention. FIG. 8A shows an isomeric view thereof, FIGS. 8B and 8C shows detail view from FIG. 8D, which shows a top view, and FIG. 8E show a section view of A-A from FIG. 7C.

Figure 9A:
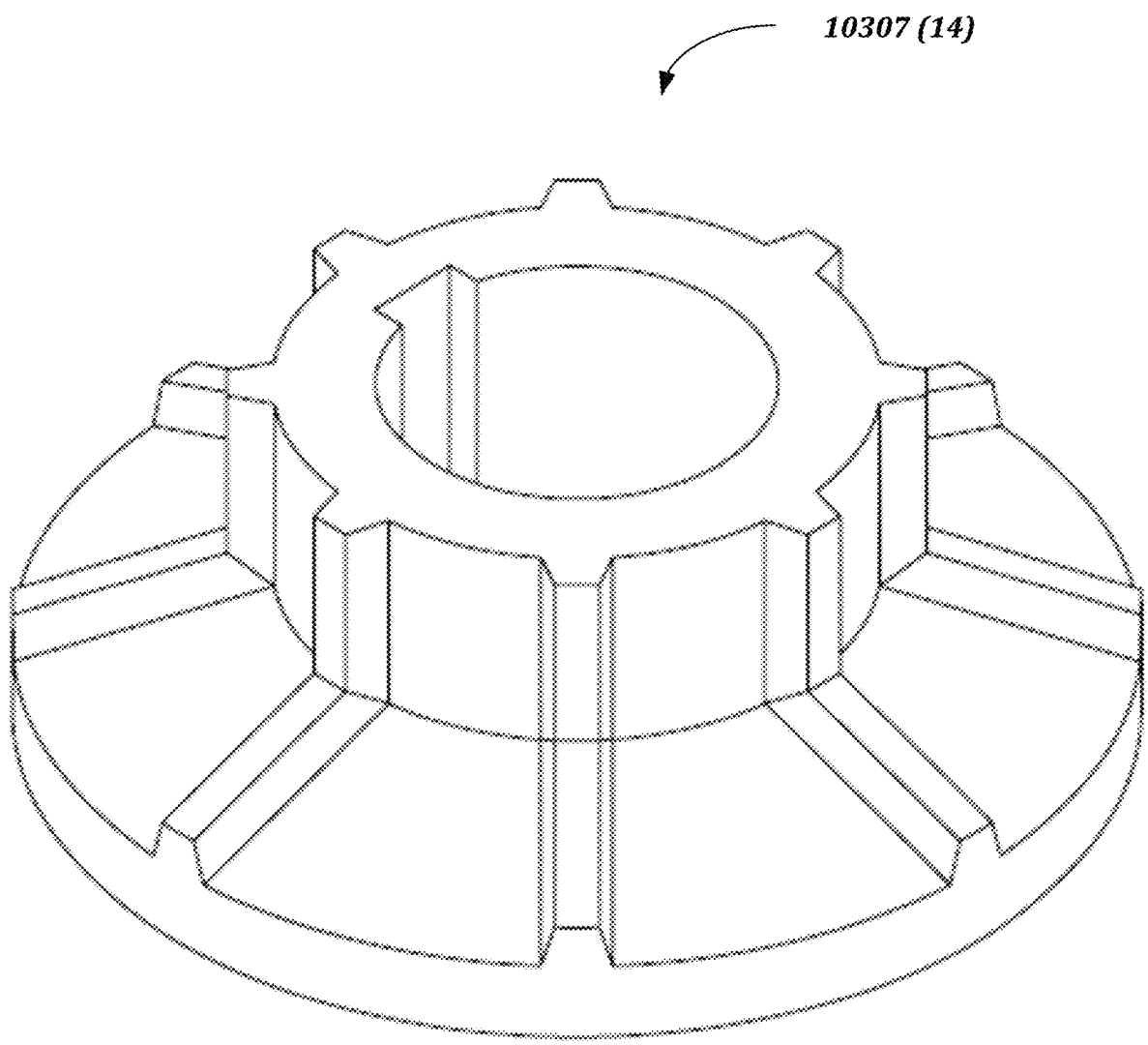
FIGS. 9A-9D shows various view of a conical rotor from a mechanical rotating device in accordance with an embodiment of the present invention.
Figure 9B:
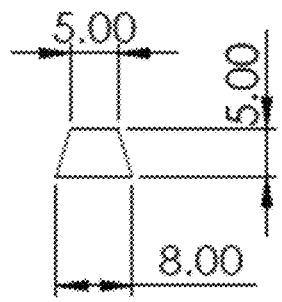
Figure 9C:
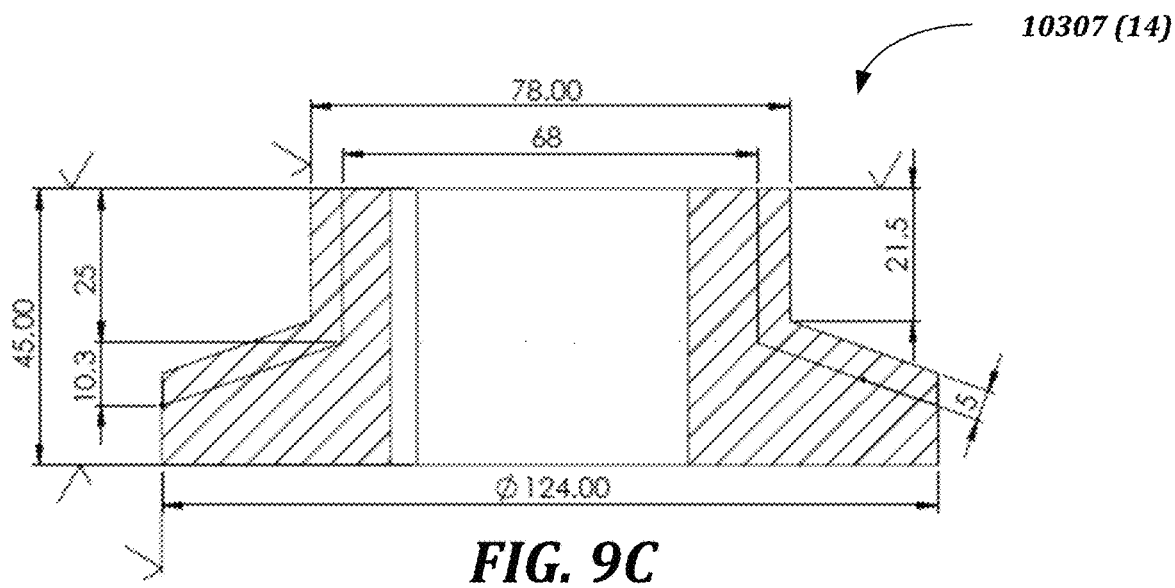
Figure 9D:
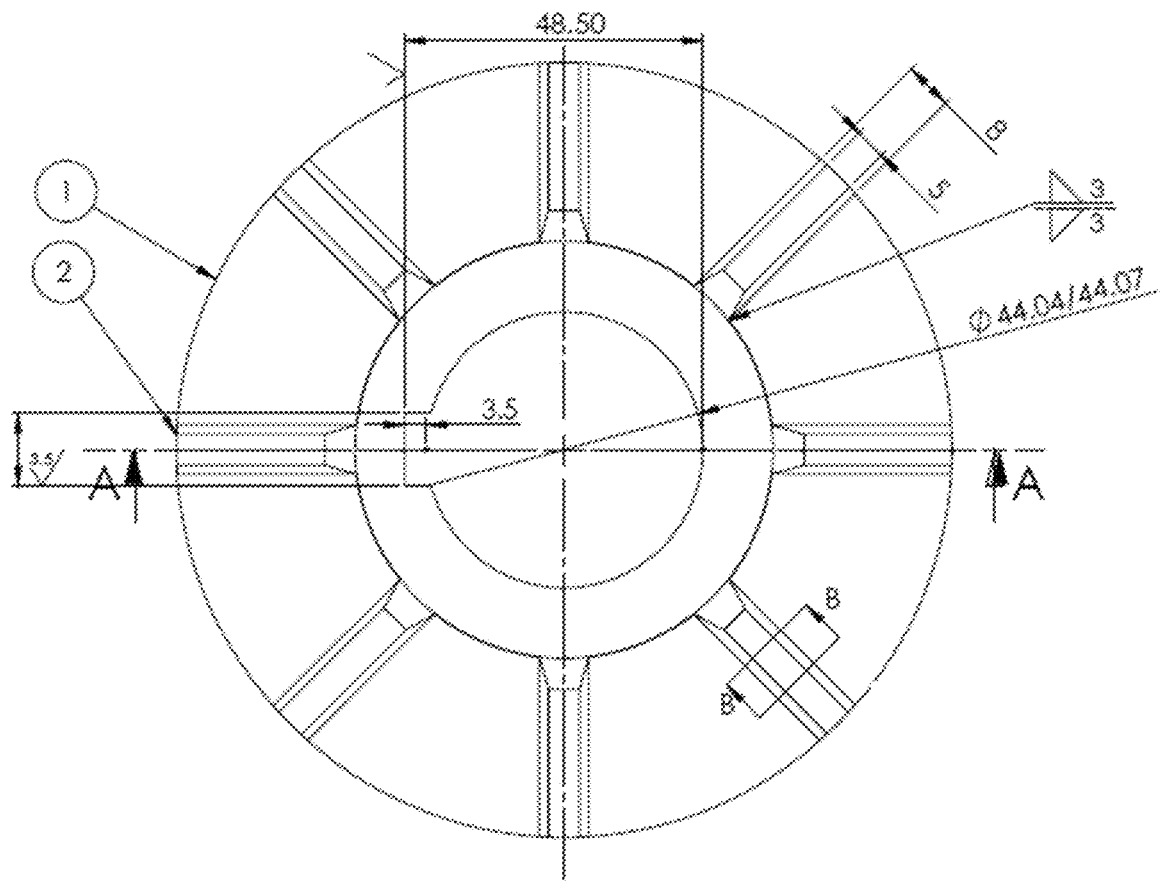

FIGS. 9A-9D shows various view of CONICAL ROTOR 10307 (14) from mechanical rotating device (C) in accordance with an embodiment of the present invention. FIG. 9A shows an isomeric view thereof, FIG. 9B shows detail view from FIG. 9D, which shows a top view depicting plate portion 91 and eight bar elements 92 on the surface, and FIG. 9C show a section view of A-A from FIG. 9D.

Figure 10A:
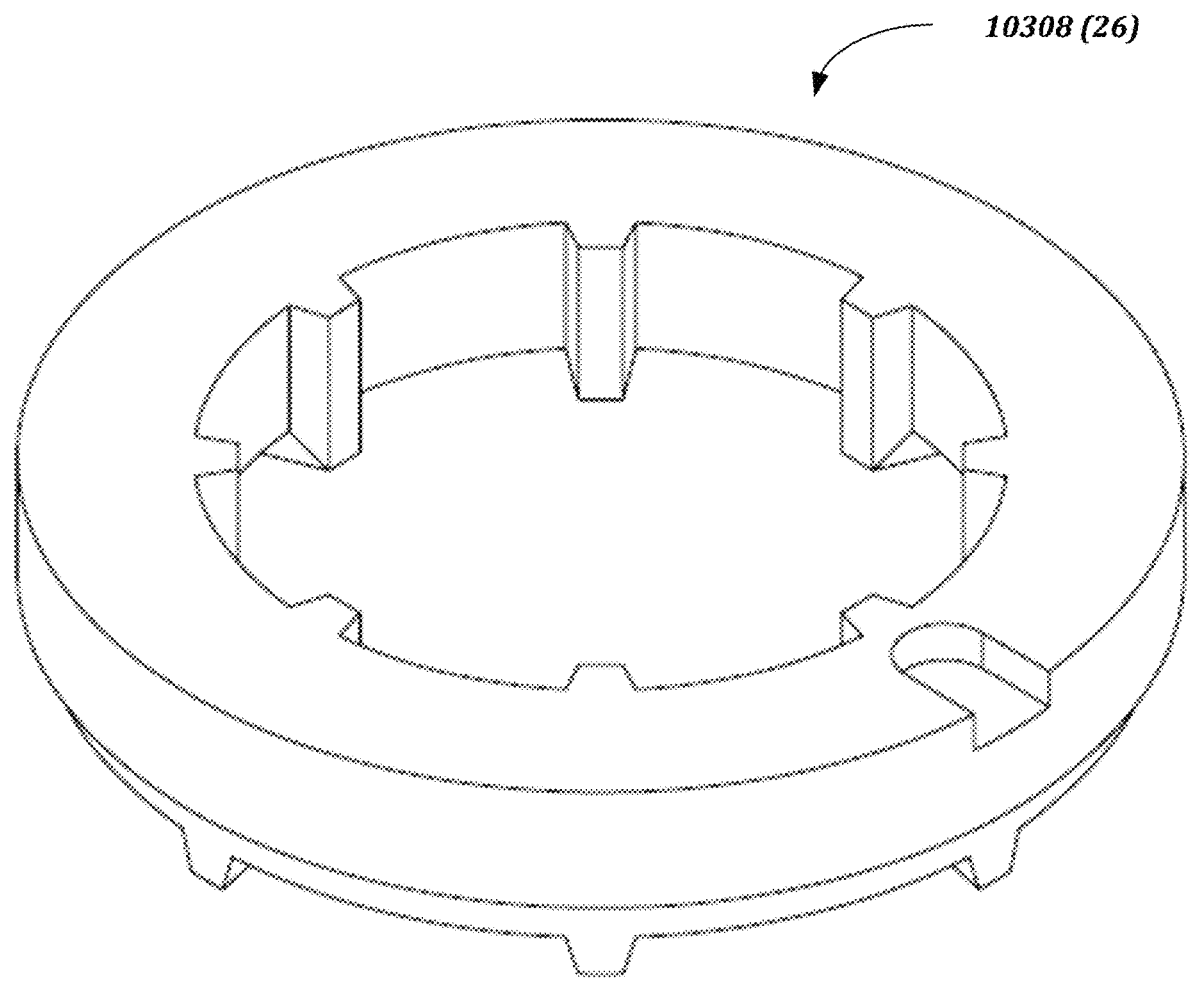
FIGS. 10A-10D shows various view of a conical stator from a mechanical rotating device in accordance with an embodiment of the present invention.
Figure 10B:
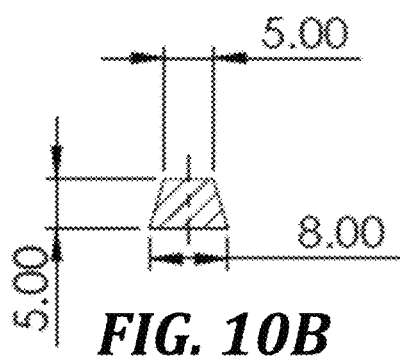
Figure 10C:
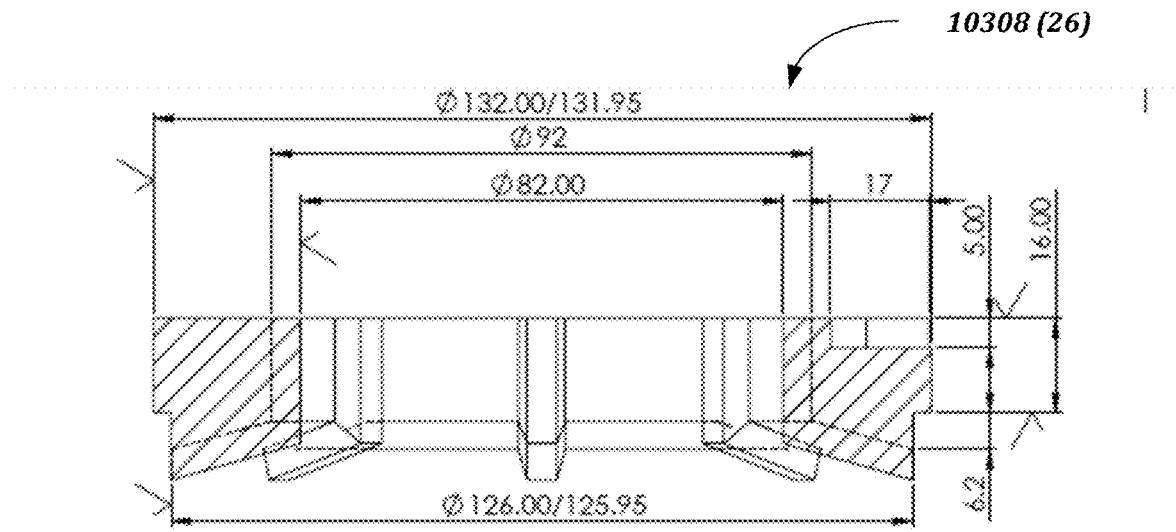
Figure 10D:
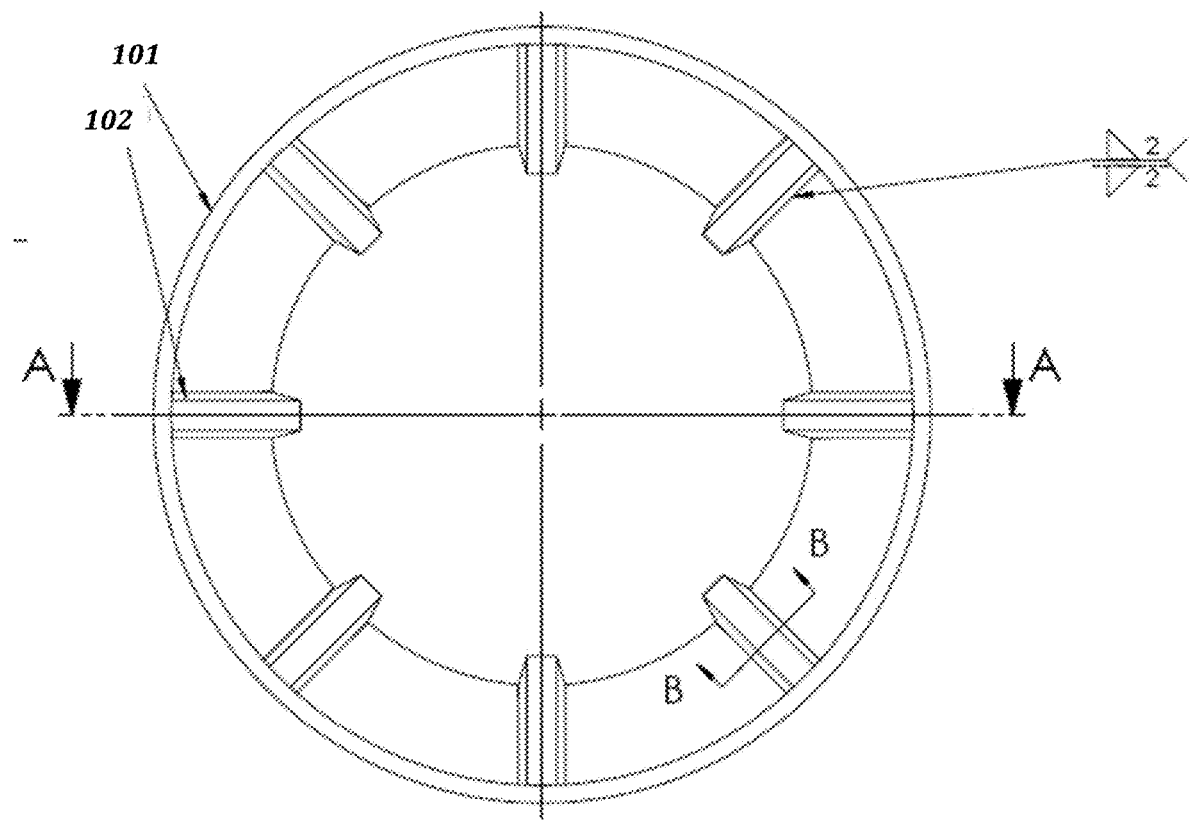
Figure 11A:
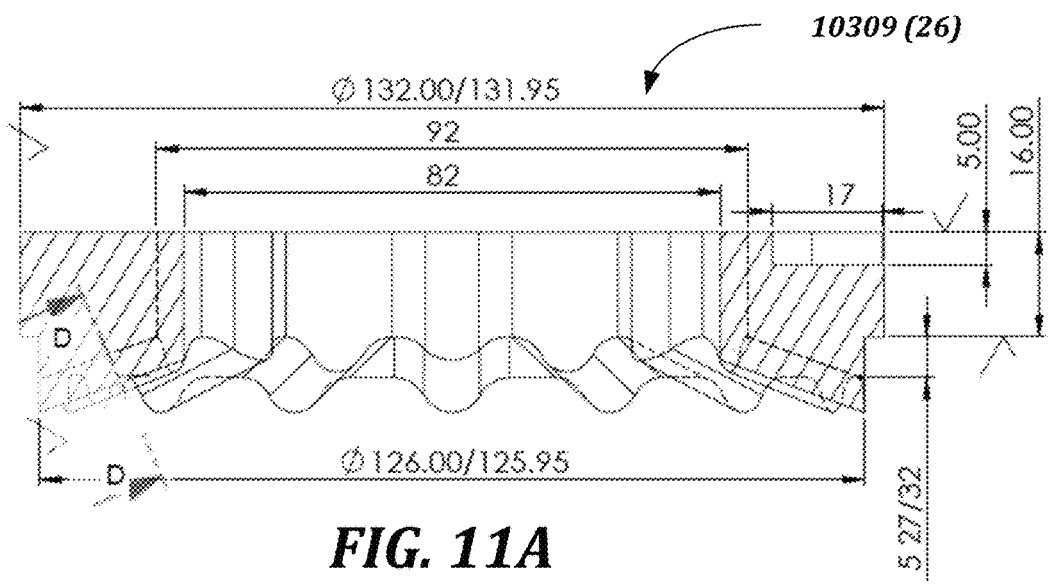
FIGS. 11A-11D shows various view of a conical stator from a mechanical rotating device in accordance with another embodiment of the present invention.
Figure 11B:
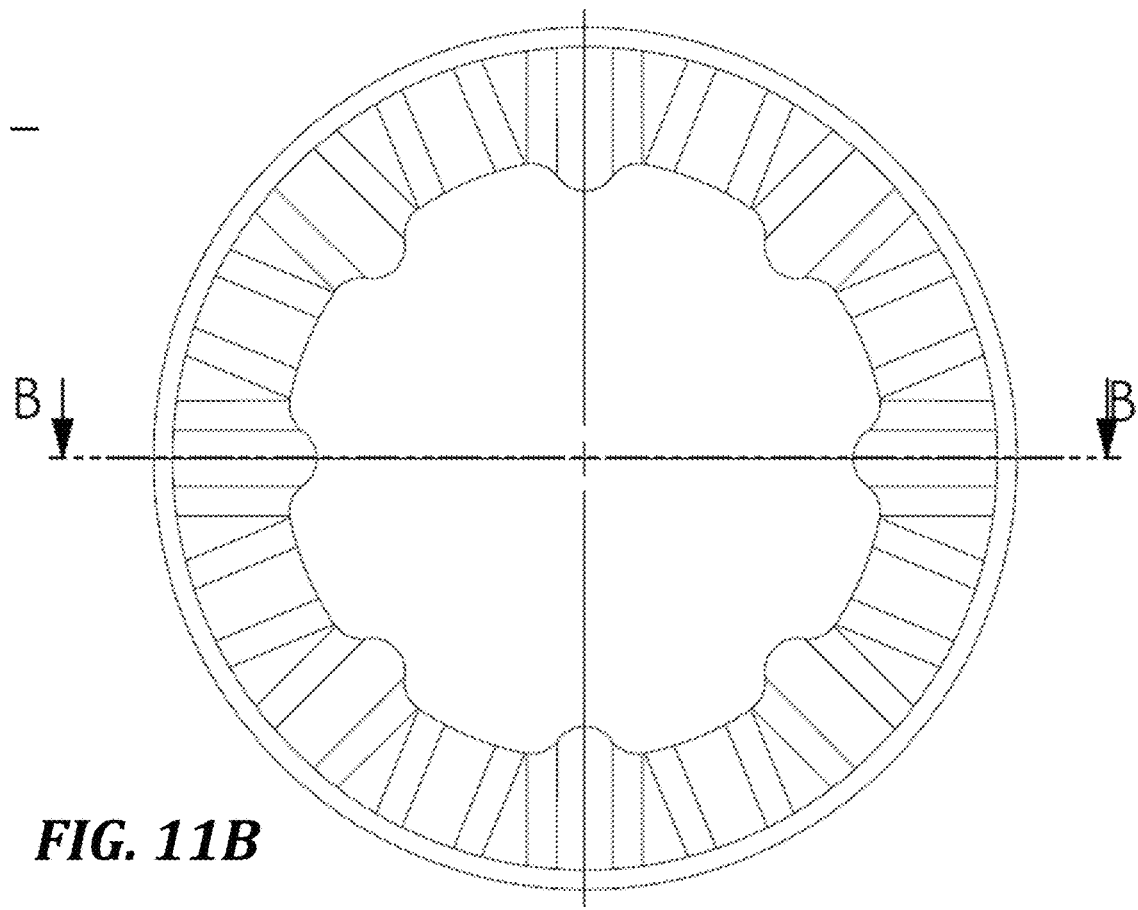
Figure 11C:
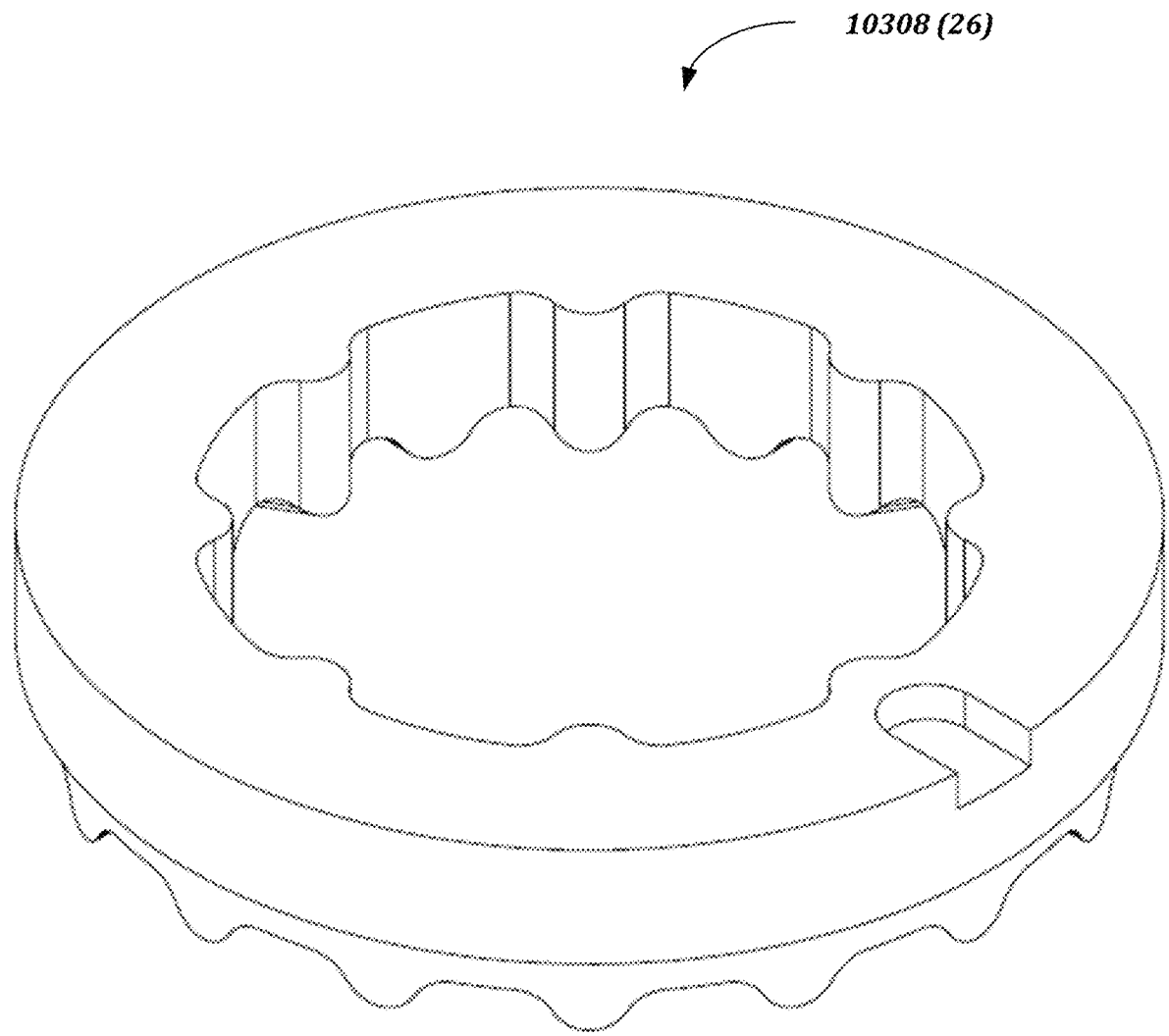
Figure 11D:
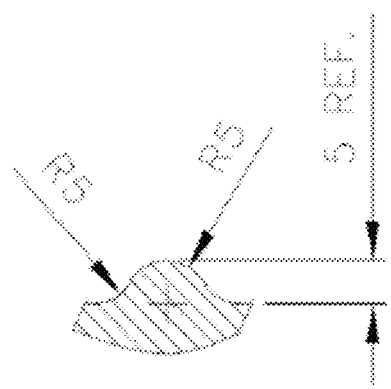

FIGS. 10A-10D shows various view of CONICAL STATOR A01 10308 (26) from mechanical rotating device (C) in accordance with an embodiment of the present invention. FIG. 10A shows an isomeric view thereof, FIG. 10B shows detail view from FIG. 10D, which shows a top view depicting plate portion 101 and eight bar elements 102 on the surface, and FIG. 10C shows a section view A-A from FIG. 10D. FIGS. 11A-11D shows various view of CONICAL STATOR B01 10309 (26) from mechanical rotating device (C) in accordance with another embodiment of the present invention. FIG. 11A shows a section view A-A from FIG. 11B, FIG. 11B shows a top view thereof, FIG. 11C shows an isomeric view thereof, and FIG. 11D section view D-D from FIG. 11A. As shown, this embodiment comprises a sinusoidal surface profile as compared to the plate and bar arrangement from FIG. 10D.

In further aspects, systems in accordance with illustrative embodiments of the present invention, such as system 100 and 300, may also include various other electrical devices such as, for example, heaters, turbines, pumps, measurement devices, internal component temperatures, and other suitable devices. Such electrical device may be linked through any suitable means of transferring electrical signals and/or making electrical connections. In still further aspects, the systems may also include one or more heating sources. In some aspects, the heating source may be in thermal communication with the reaction or process tank to transfer thermal energy from the heating sources to the biomass feedstock and/or process fluid contained within the reaction tank. In other aspects, the heating source may be in thermal communication with the biomass feedstock module to transfer thermal energy from the heating sources to the biomass feedstock prior to entering the reaction tank. The heating source may be any desired source of thermal energy, such as, for example, an electric heater or exhaust gas from a generator as described herein.

Figure 12:
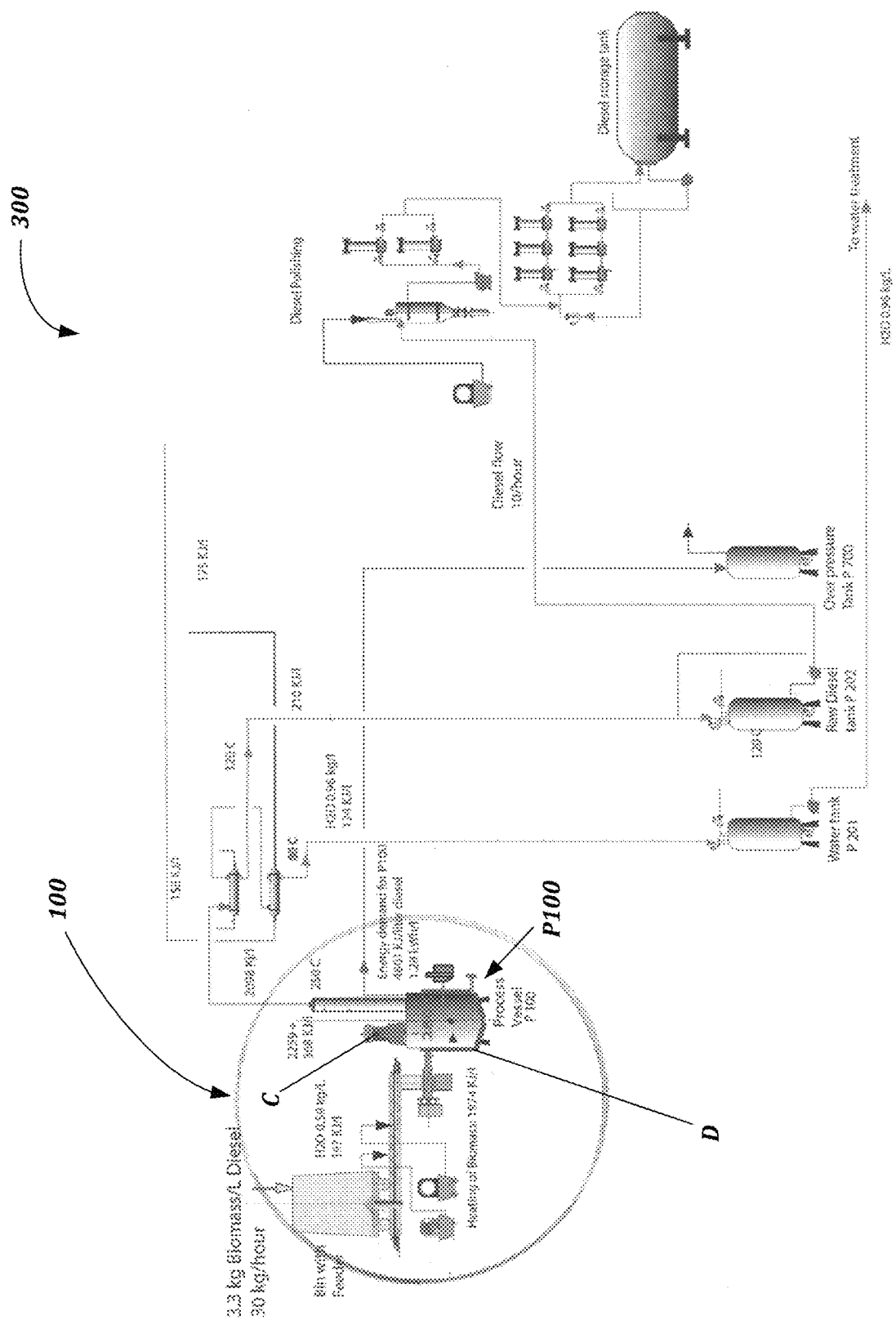
FIG. 12 shows a diagram of system configuration in accordance with an illustrative embodiment of the present disclosure.
Figure 13:
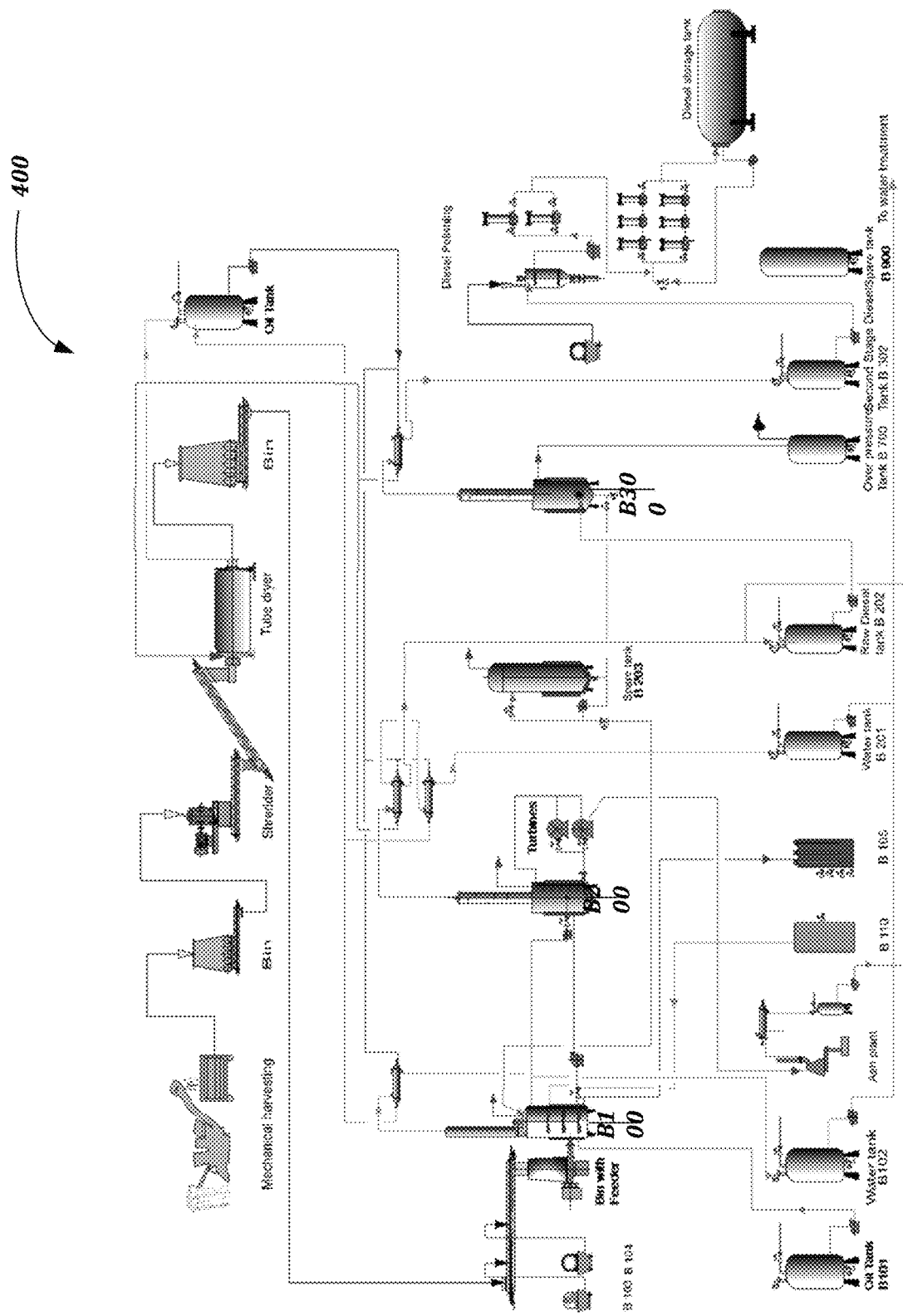
FIG. 13 shows a diagram of a prior biomass conversion system.

FIG. 12 shows a diagram of a system 300 for converting biomass to biofuel in accordance with another illustrative embodiment of the present invention. FIG. 13 shows prior system 400, which requires pumping oil between different process tanks (i.e., Mixing Vessel B100 and Process Vessel B200) having a 100-degree Celsius differential temperature range, making the temperature control of B200 a bit more problematic and subject to substantial energy and calories loss. In addition, with the turbines installed in a loop outside B200, the temperature of the return oil is dependent of flow and energy applied, which is an additional temperature control challenge and source of energy loss.

In contrast, system 300 configuration employing system 100 with integrated reactor apparatus (P100), which includes mechanical rotating device (C) mounted inside a single process tank (D), can achieve biomass reduction with an internal mixing zone, operating at 280° C., and provide higher biofuel yields. To this end, at least three process tanks (Mixing Vessel B100, Process Vessel B200, and Secondary Distillation Vessel B300) from system 400 can be replaced with the integrated reactor apparatus P100 of the present invention. Moreover, use of an integrated reactor apparatus in accordance with the present invention can allow reduction of pumps in addition to the number of tanks in a total biomass conversion system.

D. System Operation and Methods for Use

Also disclosed herein are methods of using the disclosed devices and systems. For example, in another illustrative aspect, the present disclosure provides a method for converting biomass to biofuel using a disclosed apparatus or system.

Figure 14:
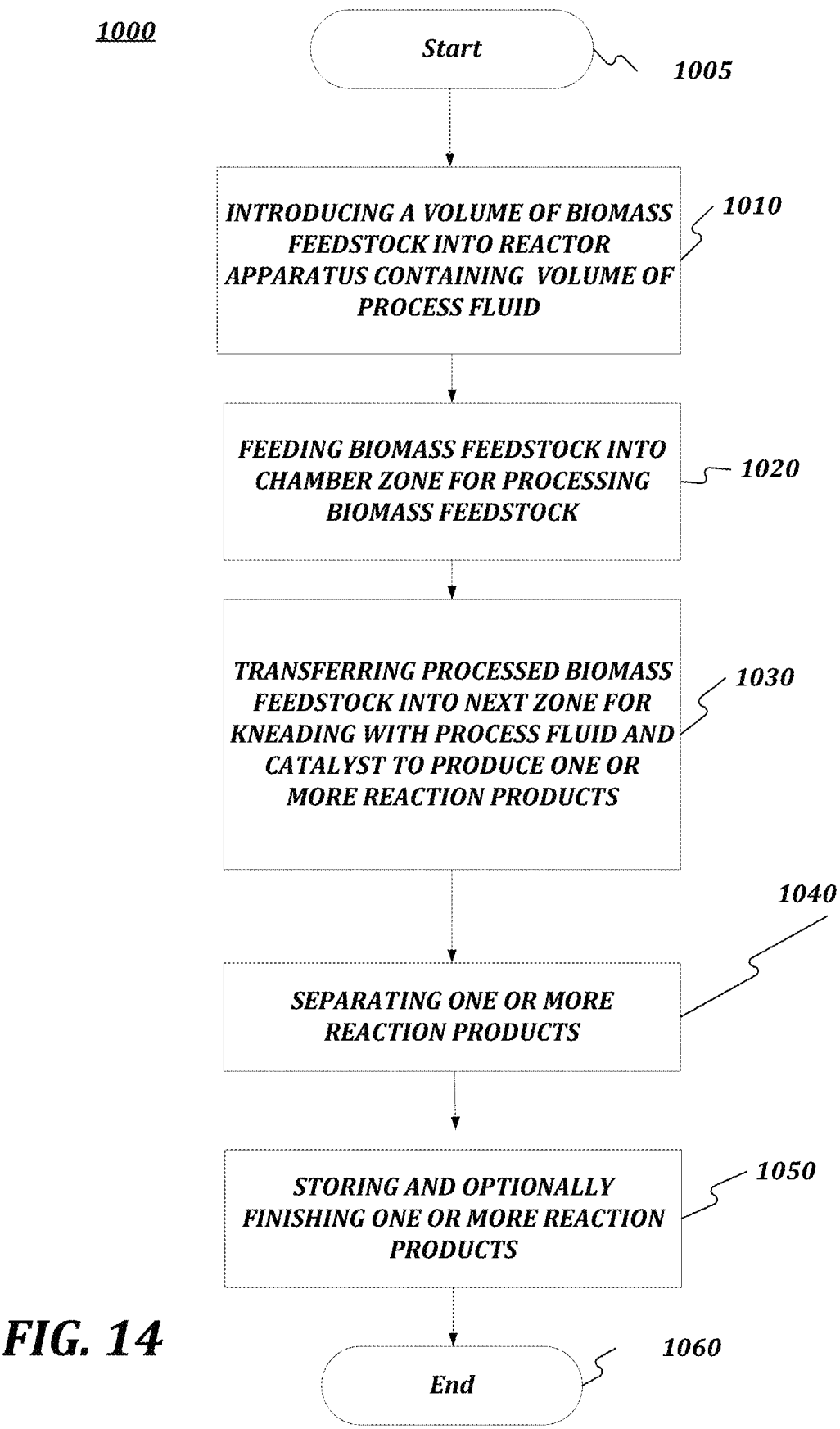
FIG. 14 is a flow chart of a method for producing biofuel from biomass using a disclosed system in accordance with an illustrative embodiment of the present disclosure.

FIG. 14 is a flow chart setting forth the general stages involved in a method 1000 consistent with an embodiment of the disclosure for producing biofuel from biomass using a disclosed reactor apparatus or system. Method 1000 may be implemented using, at least in part, system 100 and system 300. Although stages are disclosed with reference to system 100 and 300, it should be understood that other disclosed embodiments may enable the operation of method 1000, including, but not limited to, other mechanisms, mechanical components, environment properties, user conditions, and the like. Further still, although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein.

Method 1000 may begin at starting block 1005 and proceed to stage 1010, where a volume of biomass feedstock is introduced into a reactor apparatus containing process fluid. By way of non-limiting example, biomass feedstock may by introduced into heated process oil, lime and catalyst contained in, for example, reaction tank (D) with mechanical rotating device (C). In some aspects, biomass feedstock may be introduced into reactor apparatus using biomass feed bin (A) and biomass feed screw (B). In further aspects, once introduced into reaction tank (D), biomass feedstock may be conveyed or pulled into a first (such as into a feeding section or first processing section) zone having a first rotatable feed screw member arrangement, such as first rotatable feed screw member (9) for receiving, feeding, and/or initially processing biomass feedstock. Biomass feedstock with process fluid may be pulled into or otherwise enter through one or more openings or inlets in the submergible chamber of the mechanical rotating device (C), which contain the various distinct process zones, is submerged in the process fluid, and is configured to operate within process fluid mixture contained in the reaction tank. From stage 1010, where the biomass feedstock has been introduced into first feed zone of reaction apparatus, method 1000 may proceed to stage 1020 where biomass feedstock is fed into a second (which may be a first or second processing zone or the like) distinct zone having a second rotatable feed screw member arrangement, such rotatable cylindrical rotor (11) and cylindrical stator (25), where the biomass feedstock is further processed and size reduced. Process fluid and biomass may enter through four inlet ports at the top of the chamber housing, generally be located in the area around the first section of the mixer/reaction chamber. During operation of mechanical rotating device (C), biomass and process fluid are forced downwards through the various zones, by rotating feed section, the cylindrical the conical section, and internal rotor parts. It should be noted that in some embodiments, first zone may not be present and the biomass feedstock enters directly into second zone for processing.

From stage 1020, where the biomass feedstock has been processed and size reduced, method 1000 may proceed to stage 1030, where the processed biomass feedstock can be transferred into a third distinct zone (such as, for example, a reaction zone) having a third rotatable feed screw member arrangement, such as rotatable conical rotor (14) and/or conical stator (23) for treat the processed biomass feedstock by kneading it with catalyst and heated process oil in reaction tank under conditions effective to convert at least a portion of the processed biomass feedstock to at least one reaction product. In further aspects, stage 1030 takes place in the zone or section of the reaction apparatus having a conical design and configuration, employing a conical rotatable member configured to increase retention time of biomass within this zone. According to further aspects of the invention, an enhance condition generated may include increased retention (e.g., kneading) time of the biomass in device chamber zone through separation of the biomass feed material by density. In this conical section, the biomass material density separation can be higher and retention time is dependent on the production or conversion rate. This step may be continued until all or substantially all the biomass feedstock has been converted into one or more desired reaction product(s), for example, diesel fume, water and $CO_2$. Discharge from the mixer chamber may be through multiple discharge ports, such as the four discharge ports shown at the lower part of the chamber housing area of mechanical rotating device (C).

In some embodiments, the method may be a batch method. In other embodiments, the method may be continuous. During the various stages of the method, the process fluid temperature, pH, and other parameters may be adjusted to ensure method maintains optimal reaction conditions. For example, the process fluid may be heated to within optimal range and lime may be added to adjust the pH to optimal alkaline range. The adjustments may be continuous or batch-wise. One or more reaction byproducts may also be produced, such as silicate, ash, and the like. Depending on the type of biomass used, the percentage of byproduct may be from greater than 0% to less than about 5%, such as about 1, 2, 3, or 4%. To this end, the method may include a cleaning stage or step, where byproducts and/or contamination may be cleaned from the process fluid, continuously or batch wise.

From stage 1030, where the processed biomass feedstock is converted to at least one reaction product, method 1000 may proceed to stage 1040, where the reaction product may be distilled to produce distillate. For example, separation unit (E) with condenser (F) can be used to separate reaction products directly from the reaction tank (D). For example, generated biodiesel fume and water (e.g., steam), may be condensed using two different temperature range condensers, one for diesel and one for water. In further aspects, the $CO_2$, which may be in concentrated phase, can be recovered and vented to other areas for use in other stages and system areas.

From stage 1040, where reaction product(s) has been produced and separated, method 1000 may proceed to stage 1050, where reaction product(s), such as biodiesel fume, may be optionally finished or polished before or after storage through a polishing unit. After stage 1050 where the biofuel is stored, method 1000 may end at stage 1060. In some embodiments, some of the produced biofuel may be directly routed to a generator or other area to be used as fuel for powering the system.

The present invention includes at least the following aspects:

Aspect 01: A system for converting biomass to biofuel, the system comprising: a reaction apparatus comprising: a reaction tank having an inner surface defining an interior space and configured to hold a process fluid; at least one mechanical rotating device comprising: a submergible chamber configured to operate within reaction fluid contained within the reaction tank, the submergible chamber having an inner surface defining an interior space and comprising a plurality of zones including: a zone (or section) including a rotatable member and configured to process biomass feedstock; and a zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis; and a drive source for driving the shaft about said axis.

Aspect 02: A system for converting biomass to biofuel, the system comprising: a reaction apparatus comprising: a reaction tank having an inner surface defining an interior space and configured to hold a reaction or process fluid; at least one mechanical rotating device comprising: a submergible chamber configured to operate within reaction fluid contained within the reaction tank, the submergible chamber having an inner surface defining an interior space and comprising a plurality of zones including: a first zone (or section) including a first rotatable member and configured to receive biomass feedstock; a second zone (or section) including a second rotatable member and configured to process biomass feedstock from the first feeding zone; and a third reaction zone (or section) including a third rotatable member and configured to treat the processed biomass feedstock effective to convert at least a portion of the processed biomass feedstock to at least one reaction product; a shaft in operable communication with each of the first, second, and third rotatable members for rotating said rotatable members about an axis; and a drive source for driving the shaft about said axis.

Aspect 03: A mechanical rotating system comprising: at least one mechanical rotating device configured to operatively couple with a reaction tank, the at least one mechanical rotating device comprising: a submergible chamber configured to operate within process fluid contained within the reaction tank, the submergible chamber having an inner surface defining an interior space and comprising a plurality of zones including: a zone (or section) including a rotatable member and configured to process biomass feedstock; and a zone (or section) including a rotatable member and configured to treat the processed biomass feedstock effective to convert at least a portion of the processed biomass feedstock to at least one reaction product; a shaft in operable communication with each of the rotatable members for rotating said rotatable members about an axis; and wherein the shaft is configured to be driven about said axis using a drive source.

Aspect 04: The system of any preceding aspect, further comprising a plurality of mechanical rotating devices.

Aspect 05: The system of any preceding aspect, wherein the plurality of zones comprises at least one of: a feeding zone, a processing zone and/or reaction zone, or combinations thereof.

Aspect 06: The system of any preceding aspect, wherein a first zone comprises a first feeding zone (or section) including a first rotatable member and configured to receive biomass feedstock.

Aspect 07: The system of any preceding aspect, wherein the second zone comprises a first processing zone (or section) including a second rotatable member and configured to process biomass feedstock from a first feeding zone.

Aspect 08: The system of any preceding aspect, wherein the third zone comprises a first reaction zone (or section) including a third rotatable member and configured to treat the processed biomass feedstock under conditions effective to convert at least a portion of the processed biomass feedstock to at least one reaction product.

Aspect 09: The system of any preceding aspect, wherein the reaction zone comprises catalyst and lime.

Aspect 10: The system of any preceding aspect, wherein the first zone comprises a feed section configured to receive and feed biomass feedstock to an adjacent zone.

Aspect 11: The system of any preceding aspect, wherein the second zone comprises a size reduction section configured to size reduce biomass feedstock from the first zone.

Aspect 12: The system of any preceding aspect, wherein the third zone comprises a kneading section configured to knead the processed biomass feedstock with catalyst and reaction fluid under conditions effective to convert at least a portion of the processed biomass feedstock to at least one reaction product.

Aspect 13: The system of any preceding aspect, wherein the first zone is in fluid communication with the second zone.

Aspect 14: The system of any preceding aspect, wherein the second zone is in fluid communication with the third zone.

Aspect 15: The system of any preceding aspect, wherein the first feeding zone is in fluid communication with the first processing zone.

Aspect 16: The system of any preceding aspect, wherein the first processing zone is in fluid communication with the first reaction zone.

Aspect 17: The system of any preceding aspect, wherein a rotatable member comprises a feed screw, rotor, or the like.

Aspect 18: The system of any preceding aspect, wherein each rotatable member comprises a surface profile defined by one or more blades, teeth, or fins disposed on an outer surface.

Aspect 19: The system of any preceding aspect, wherein the blade comprises a spiral blade.

Aspect 20: The system of any preceding aspect, wherein the first rotatable member comprises a feed screw configured to move biomass feedstock into the first processing zone.

Aspect 21: The system of any preceding aspect, wherein the second rotatable member comprises a cylindrical rotor configured to process the biomass feedstock.

Aspect 22: The system of any preceding aspect, wherein the third rotatable member comprises a conical rotor configured to facilitate conversion of the processed biomass feedstock into at least one reaction product.

Aspect 23: The system of any preceding aspect, wherein the plurality of zones is in a stacked configuration.

Aspect 24: The system of any preceding aspect, wherein conditions effective to convert at least a portion of the processed biomass feedstock comprise: atmospheric pressure, alkali conditions, process and/or temperature range: 250-350° C., or combinations thereof.

Aspect 25: The system of any preceding aspect, wherein conditions effective to convert at least a portion of the processed biomass feedstock comprise: a process pressure of about 17 MPa (2465 psig), a biomass conversion time of about 30 minutes, and at a temperature of about 280 degrees Celsius. (536° F.).

Aspect 26: The system of any preceding aspect, wherein conditions effective to convert at least a portion of the processed biomass feedstock comprise a conical helical "lifter" in bottom zone and/or elimination of upper flights to produce a plug flow movement of solid.

Aspect 27: The system of any preceding aspect, wherein the drive source comprises a motor, or the like.

Aspect 28: The system of any preceding aspect, wherein the each of the rotatable members are driven by the same drive source.

Aspect 29: The system of any preceding aspect, wherein the reaction product comprises at least one of biofuel, water, char, ash, and/or carbon dioxide, and combinations thereof.

Aspect 30: The system of any preceding aspect, wherein the biomass comprises cellulosic organic material.

Aspect 31: The system of any preceding aspect, wherein the biofuel comprises renewable liquid fuel.

Aspect 32: The system of any preceding aspect, wherein the biofuel comprises renewable liquid fuel in the diesel boiling range.

Aspect 33: The system of any preceding aspect, wherein the renewable liquid fuel comprises diesel fuel.

Aspect 34: The system of any preceding aspect, further comprising a power source.

Aspect 35: The system of any preceding aspect, wherein the power source comprises a generator.

Aspect 36: The system of any preceding aspect, wherein the power source comprises a diesel generator configured to operate using biofuel produced by the system.

Aspect 37: The system of any preceding aspect, further comprising a distillation module.

Aspect 38: The system of any preceding aspect, further comprising a biomass feed module configured to dispense biomass feedstock into the system.

Aspect 39: The system of any preceding aspect, further comprising a biofuel polishing module.

Aspect 40: The system of any preceding aspect, wherein the distillation module comprises a distillation tower, condenser, and/or measuring pipe, or combinations thereof.

Aspect 41: The system of any preceding aspect, wherein the biomass feed module comprises a biomass feed bin, biomass feed screw or conveyor, and/or biomass heater, or combinations thereof.

Aspect 42: The system of any preceding aspect, wherein the at least one mechanical rotating device comprises a surface profile as shown in the figures.

Aspect 43: The system of any preceding aspect, wherein the system is effective to yield a biomass conversion to liquid fuel 20-30% higher than a reference system substantially similar to system 400.

Aspect 44: The system of any preceding aspect, wherein the system is effective to require process energy 30-40% less than a reference system substantially similar to system 400.

Aspect 45: The system of any preceding aspect, wherein the system is effective to control process temperature within the target of +/−1-degree C.

Aspect 46: A method for converting biomass to biofuel, comprising the steps of: a) providing a reaction apparatus or system of any preceding aspect; b) introducing a volume of biomass feedstock into the reaction apparatus or system containing a volume of carrier oil; c) producing a reaction product using the biomass feedstock and process oil; d) distilling the reaction product to produce a distillate; and e) producing biofuel using the distillate.

Aspect 47: The method of any preceding aspect, further comprising introducing at least one catalyst to the carrier oil and biomass feedstock effective to catalyze breakdown at least a portion of the biomass.

Aspect 48: The method of any preceding aspect, wherein the catalyst comprises catalysts of potassium, sodium, calcium, and/or magnesium-aluminum silicates, or combinations thereof.

Aspect 49: The method of any preceding aspect, wherein the catalyst comprises fully crystallized catalysts.

Aspect 50: The method of any preceding aspect, wherein the catalyst is zeolite.

Aspect 51: The method of any preceding aspect, wherein introducing the biomass feedstock comprises introducing the biomass feedstock into a first (feed) zone of the mechanical rotating device.

Aspect 52: The method of any preceding aspect, further comprising feeding the biomass feedstock into a second (processing) zone where biomass feedstock is processed and size reduced.

Aspect 53: The method of any preceding aspect, further comprising transferring biomass feedstock into third (reaction) zone to treat biomass feedstock by kneading it with heated process oil in reaction tank under conditions effective to convert at least a portion of the biomass feedstock to at least one reaction product.

Aspect 54: The method of any preceding aspect, further comprising distilling the reaction product to produce a distillate.

Aspect 55: The method of any preceding aspect, further comprising producing biofuel using the distillate.

Aspect 56: The method of any preceding aspect, wherein the biofuel is liquid diesel.

Aspect 57: The method of any preceding aspect, wherein the method is effective to yield a biomass conversion to liquid fuel 20-30% higher than a reference system substantially similar to system 400.

Aspect 58: The method of any preceding aspect, wherein the method is effective to require process energy 30-40% less than a reference system substantially similar to system 400.

Aspect 59: The method of any preceding aspect, wherein the method is effective to control process temperature within the target of +/−1-degree C.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed:

1. A method for converting biomass, comprising the steps of:
    introducing a volume of biomass feedstock into a reaction apparatus under conditions effective to produce at least one reaction product, the reaction apparatus comprising:
        a reaction tank having an inner surface defining an interior space and configured to hold a reaction or process fluid;
        at least one mechanical rotating device comprising:
            a submergible chamber configured to operate within reaction fluid contained within the reaction tank, the submergible chamber having an inner surface defining an interior space and comprising a plurality of zones including:
                a first zone including a first rotatable member and configured to receive biomass feedstock;
                a second zone including a second rotatable member and configured to process biomass feedstock from the first zone; and
                a third zone including a third rotatable member and configured to treat the processed biomass feedstock effective to convert at least a portion of the processed biomass feedstock to the at least one reaction product;
            a shaft in operable communication with each of the first, second, and third rotatable members for rotating said rotatable members about an axis; and
            a drive source for driving the shaft about said axis; the first rotatable member comprising a feed screw configured to move biomass feedstock into the second zone; the second rotatable member comprising a cylindrical rotor configured to process the biomass feedstock; and the third rotatable member comprising a conical rotor configured to facilitate conversion of the processed biomass feedstock into the at least one reaction product.

2. The method of claim 1, wherein the reaction the reaction or process fluid comprises a volume of carrier oil.

3. The method of claim 2, wherein the at least one reaction product is produced using the biomass feedstock and the reaction or process fluid.

4. The method of claim 3, further comprising distilling the at least one reaction product to produce at least one distillate.

5. The method of claim 4, further comprising producing biofuel using the at least one distillate.

6. The method of claim 2, further comprising introducing at least one catalyst to the carrier oil and biomass feedstock effective to catalyze breakdown at least a portion of the biomass.

7. The method of claim 6, wherein the catalyst comprises catalysts of potassium, sodium, calcium, or magnesium-aluminum silicates, or combinations thereof.

8. The method of claim 6, wherein the catalyst comprises fully crystallized catalysts.

9. The method of claim 6, wherein the catalyst is zeolite.

10. The method of claim 2, wherein introducing the biomass feedstock comprises introducing the biomass feedstock into the first zone.

11. The method of claim 10, further comprising feeding the biomass feedstock into the second zone for processing and size reducing the biomass feedstock.

12. The method of claim 11, further comprising transferring biomass feedstock into the third zone to treat the biomass feedstock by kneading it with heated process oil under conditions effective to convert at least a portion of the biomass feedstock to the at least one reaction product.

13. The method of claim 12, further comprising distilling the at least one reaction product to produce at least one distillate.

14. The method of claim 13, further comprising producing biofuel using the at least one distillate.

15. A method for converting biomass, comprising the steps of:
introducing a volume of biomass feedstock into a multi-zone submergible chamber configured to operate within reaction fluid contained within a reaction tank under conditions effective to produce at least one reaction product,
the submergible chamber having an inner surface defining an interior space and comprising a plurality of zones including:
a feed zone including a first rotatable member and configured to receive biomass feedstock;
a processing zone including a second rotatable member and configured to process biomass feedstock from the feed zone; and
a reaction zone including a third rotatable member and configured to treat the processed biomass feedstock effective to convert at least a portion of the processed biomass feedstock to biofuel.

16. The method of claim 15, wherein the at least one reaction product is produced using the biomass feedstock and the reaction fluid.

17. The method of claim 15, further comprising distilling the at least one reaction product to produce at least one distillate.

18. The method of claim 17, further comprising producing biofuel using the at least one distillate.

19. The method of claim 15, wherein the step of introducing the biomass feedstock comprises at least one of:
introducing the biomass feedstock into the feed zone of the submergible chamber;
introducing the biomass feedstock into the processing zone for processing and size reducing the biomass feedstock; or
introducing the biomass feedstock into the reaction zone to treat biomass feedstock by kneading it with heated reaction fluid in a reaction tank under conditions effective to convert at least a portion of the biomass feedstock to at least one reaction product.

20. The method of claim 15, wherein the first rotatable member comprises a feed screw configured to move biomass feedstock into the processing zone; the second rotatable member comprises a cylindrical rotor configured to process the biomass feedstock; and the third rotatable member comprises a conical rotor configured to facilitate conversion of the biomass feedstock into the at least one reaction product.

* * * * *